United States Patent
Iizuka

(10) Patent No.: US 7,860,279 B2
(45) Date of Patent: *Dec. 28, 2010

(54) IMAGE MATCHING METHOD, PROGRAM, AND IMAGE MATCHING SYSTEM

(75) Inventor: Ken Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/656,722

(22) Filed: Feb. 16, 2010

(65) Prior Publication Data

US 2010/0158342 A1 Jun. 24, 2010

Related U.S. Application Data

(63) Continuation of application No. 10/949,211, filed on Sep. 27, 2004, now Pat. No. 7,720,307.

(30) Foreign Application Priority Data

Oct. 7, 2003 (JP) ............................. 2003-348293

(51) Int. Cl.
*G06K 9/00* (2006.01)
(52) U.S. Cl. .................. 382/115; 382/280; 382/281
(58) Field of Classification Search .................. 382/115
See application file for complete search history.

(56) References Cited

U.S. PATENT DOCUMENTS 5,430,810 A * 7/1995 Saeki .......................... 382/281

(Continued)

FOREIGN PATENT DOCUMENTS

JP 4-295973 10/1992

(Continued)

OTHER PUBLICATIONS

Masamichi Ishiwata, et al., "An attempt Individual Identification in Handwritten Characters Using Hough Transform," Institute of Television Engineers of Japan Technical Report, vol. 19, No. 73, Dec. 15, 1995, pp. 73-78 (with English Abstract), ISSN 0386-4227.

(Continued)

*Primary Examiner*—Sath V Perungavoor
(74) *Attorney, Agent, or Firm*—Oblon, Spivak, McClelland, Maier & Neustadt, L.L.P.

(57) ABSTRACT

An image matching method capable of matching images with a high precision and a program and an image matching system for the same, providing a conversion unit for performing image processing based on a registered image and a match image for converting points in each image to patterns of curves based on a distance from a reference position to the closest point on a straight line passing through each point in the image from the reference position and an angle formed by a straight line passing through the reference position and the closest point and an x-axis as a reference axis including the reference position, converting linear components in the images to patterns of a plurality of overlapped curves, and generating converted images, a correlation value generation unit for performing correlation processing based on the converted images and generating a correlation value, and a matching unit for performing the matching based on a signal indicating the correlation value generated by the correlation value generation unit.

5 Claims, 16 Drawing Sheets

U.S. PATENT DOCUMENTS

| | | | |
|---|---|---|---|
| 5,548,667 A * | 8/1996 | Tu | 382/285 |
| 5,583,956 A * | 12/1996 | Aghajan et al. | 382/290 |
| 5,812,252 A * | 9/1998 | Bowker et al. | 356/71 |
| 5,832,102 A * | 11/1998 | Uchida | 382/124 |
| 6,032,167 A | 2/2000 | Takatsu | |
| 6,301,375 B1 * | 10/2001 | Choi | 382/115 |
| 6,408,105 B1 * | 6/2002 | Maruo | 382/281 |
| 6,687,421 B1 * | 2/2004 | Navon | 382/289 |
| 6,803,919 B1 * | 10/2004 | Kim et al. | 345/582 |
| 6,870,965 B2 * | 3/2005 | Kim et al. | 382/305 |
| 7,016,552 B2 * | 3/2006 | Koyama | 382/289 |
| 7,747,103 B2 * | 6/2010 | Iizuka | 382/278 |
| 2002/0028027 A1 * | 3/2002 | Koyama | 382/289 |
| 2002/0126901 A1 * | 9/2002 | Held | 382/199 |
| 2008/0232713 A1 * | 9/2008 | Iizuka | 382/281 |
| 2009/0245592 A1 * | 10/2009 | Ilzuka | 382/115 |

FOREIGN PATENT DOCUMENTS

| | | |
|---|---|---|
| JP | 9-54827 | 2/1997 |
| JP | 9-282458 | 10/1997 |
| JP | 9-330414 | 12/1997 |
| JP | 10-21391 | 1/1998 |
| JP | 10-162139 | 6/1998 |
| JP | 2001-175864 | 6/2001 |
| TW | 328576 | 3/1998 |

OTHER PUBLICATIONS

Derek C.W. Pao, et al., "Shapes Recognition Using the Straight Line Hough Transform: Theory and Generalization," IEEE Transactions on Pattern Analysis and Machine Intelligence, XP-000327681, vol. 14, No. 11, Nov. 14, 1992, pp. 1076-1089.

Pasi Franti, et al., "Hough transform for rotation invariant matching of line-drawing images," Pattern Recognition, vol. 4, XP0105333101, Sep. 3, 2000. pp. 389-392.

Hiroyuki Onishi, et al., "Detection of rotation and parallel translation using Hough and Fourier transforms," International Conference on Image Processing, vol. 3, Sep. 1996, XP-002308872, pp. 827-830.

Nalini K. Ratha, et al., "A Real-Time Matching System for Large Fingerprint Databases, "IEEE Transactions on Pattern Analysis and Machine Intelligence, IEEE Inc., vol. 10, No. 8, XP-000632861, Aug. 1996, pp. 799-812.

F. Zana. et al., "A multimodal Registration Algorithm of eye Fundus Images Using Vessels Detection and Hough Transform," IEEE Transactions on Medical Imaging, vol. 18, No. 5, XP-002308873, May 1999, pp. 419-428.

Huei-Fen Jiang, et al., "A Fast Approach to the Detection and Correction of Skew Documents, "Pattern Recognition Letter, vol. 18, No. 7, XP-004093848, Jul. 1997, pp. 675-686.

W. W. Boles, et al., "Personal Identification Using Images of the Human Palm," IEEE TENCON-Speech and Image Technologies for Computing and Telecommunications, XP-010264168, Dec. 2, 1997, pp. 295-298.

* cited by examiner

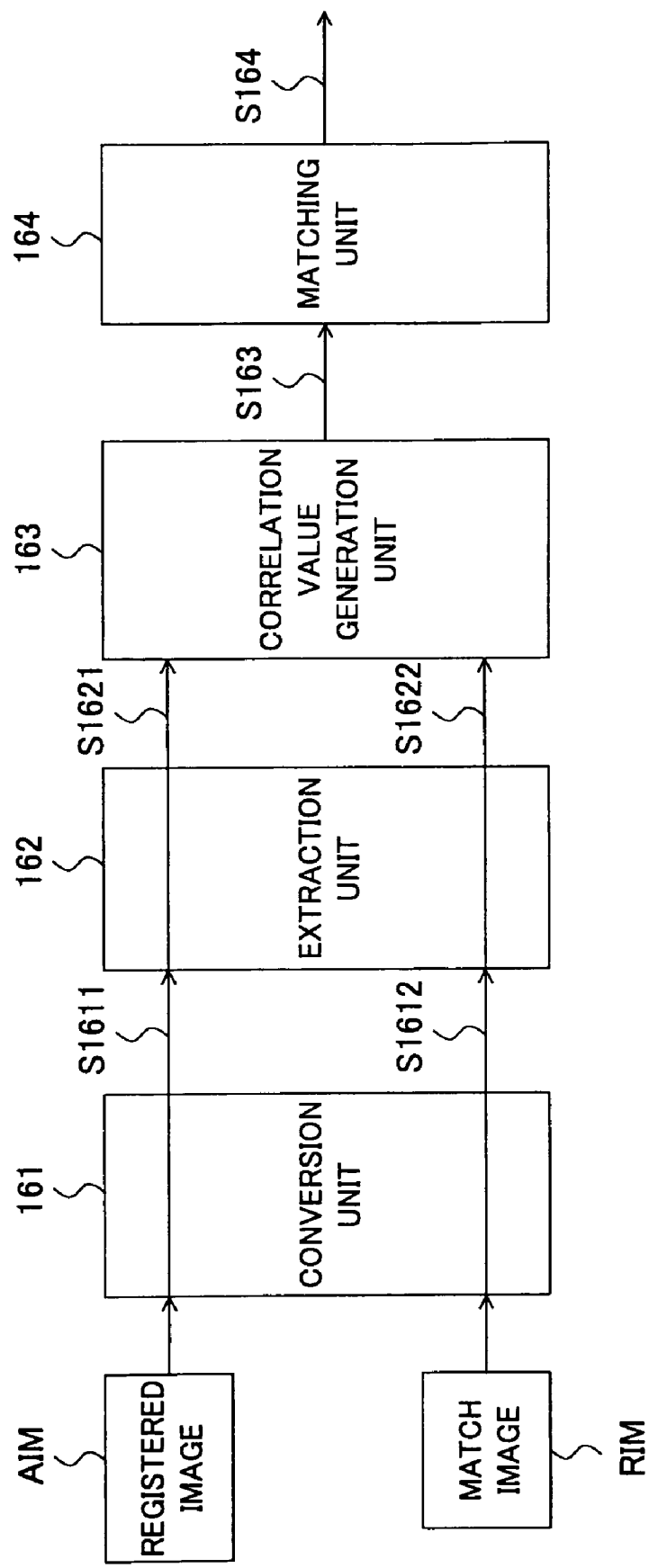

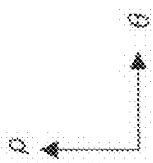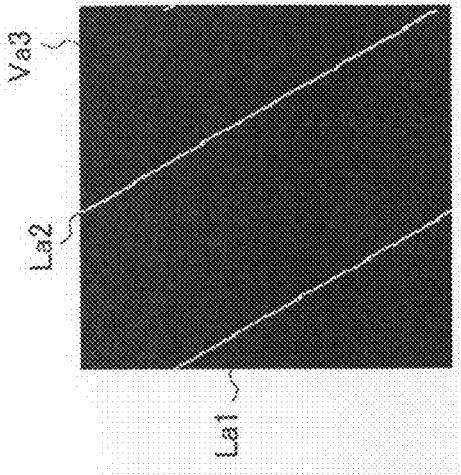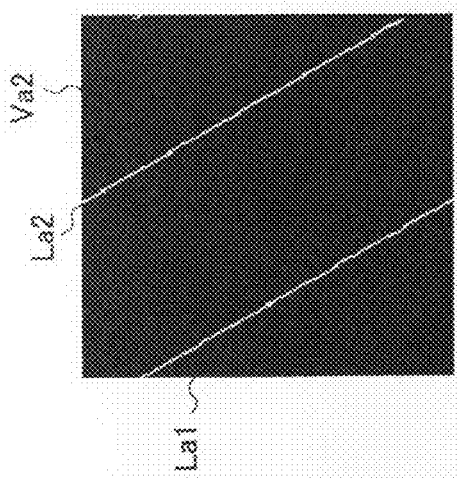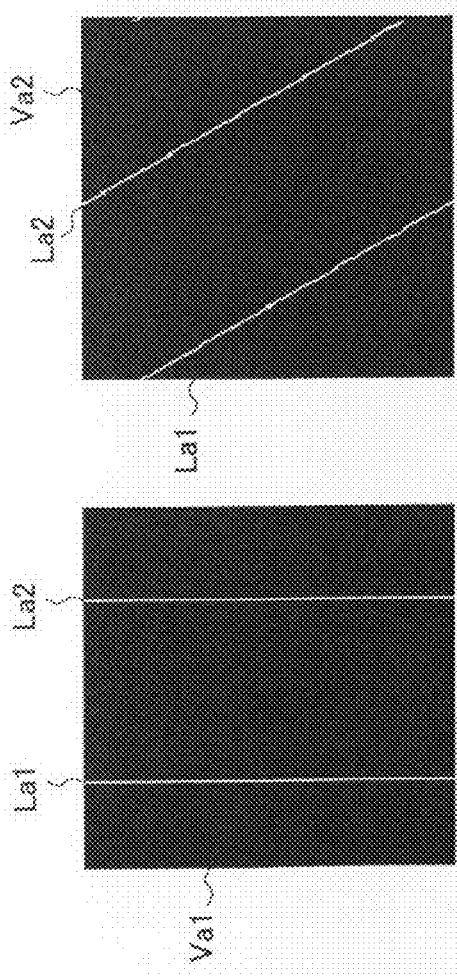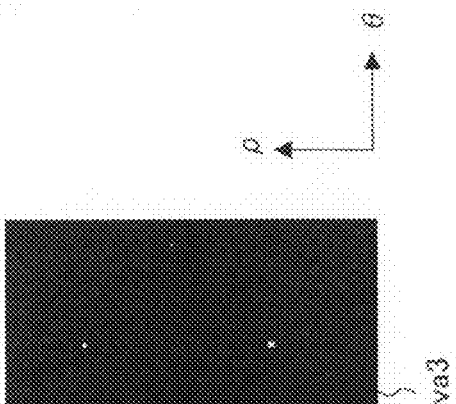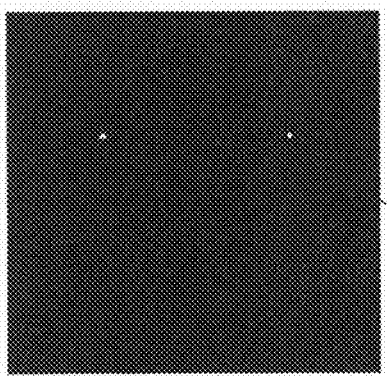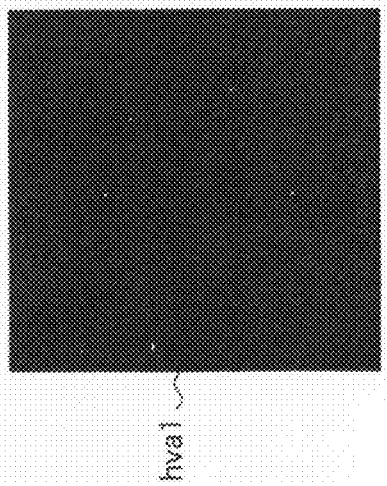

AIM

S1611

S1621

RIM

S1612

S1622

■ PEAK POSITION OF CORRELATION COMPONENTS

S1701
f1(m,n)

S1702
f2(m,n)

IMAGE MATCHING METHOD, PROGRAM, AND IMAGE MATCHING SYSTEM

CROSS-REFERENCE TO RELATED APPLICATIONS

This is a continuation of and claims the benefit of priority under 35 U.S.C. §120 from U.S. application Ser. No. 10/949,211, filed Sep. 27, 2004, the contents of which is incorporated herein by reference. U.S. application Ser. No. 10/949,211 is based upon and claims the benefit of priority under 35 U.S.C. §119 from prior Japanese Patent Application No. 2003-348293, filed Oct. 7, 2003.

BACKGROUND OF THE INVENTION

1. Field of the Invention

The present invention relates to an image matching method for matching two blood vessel images, fingerprint images, still images, moving images, and other images based on linear components in the images, and a program and an image matching system for the same.

2. Description of the Related Art

Conventionally, as systems for matching image information, various image matching systems are known. For example, an information processing apparatus for comparing for example a registered image against an image for comparison, that is, a "match image", in a predetermined positional relationship to calculate correlation values and matching a registered image against the match image based on the correlation values or an information processing apparatus generating correlation values by processing in units of pixels are known (refer to for example Japanese Unexamined Patent Publication No. 2000-194862).

In the above information processing apparatuses, however, when parallel movement, rotation, enlargement, reduction, or other offset occurs between a registered image and the match image, it is difficult to suitably generate the correlation values, so sufficient matching precision is sometimes not obtained. Consequently, improvement is demanded.

SUMMARY OF THE INVENTION

An object of the present invention is to provide an image matching method capable of matching images with a high precision and a program and an image matching system for the same.

According to a first aspect of the present invention, there is provided an image matching method for matching a first image and a second image, comprising: a first step of performing image conversion processing based on a distance from a reference position in each of the first image; and second image and an angle formed by a straight line passing through the reference position and a reference axis including the reference position and generating a first converted image and a second converted image in a two-dimensional space defined by the distance and the angle and a second step of performing matching processing of the first image against the second image based on results of the correlation processing at a plurality of different relative locations in a first direction and a second direction orthogonal to the first direction in the first converted image and second converted image generated at the first step.

Preferably, in the first step, the method performs image conversion processing of converting points in each image to patterns of curves based on the distance from the reference position to the closest point on a straight line passing through the points in the image and an angle formed by the straight line passing through the reference position and the closest point and the reference axis including the reference position and converting the linear components in each image to patterns of a plurality of overlapped curves to generate the first converted image and second converted image.

Further, according to a second aspect of the present invention, there is provided a program to be run by an information processing apparatus for matching a first image and a second image, comprising a first routine for performing image conversion processing based on a distance from a reference position in each of the first image and second image and an angle formed by a straight line passing through the reference position and a reference axis including the reference position and generating a first converted image and a second converted image in a two-dimensional space defined by the distance and the angle and a second routine of performing matching processing of the first image against the second image based on results of the correlation processing at a plurality of different relative locations in a first direction and a second direction orthogonal to the first direction in the first converted image and second converted image generated at the first routine.

Preferably, in the first routine, the program performs image conversion processing of converting points in each image to patterns of curves based on the distance from the reference position to the closest point on a straight line passing through the points in the image and an angle formed by the straight line passing through the reference position and the closest point and the reference axis including the reference position and converting the linear components in each image to patterns of a plurality of overlapped curves to generate the first converted image and second converted image.

Further, according to a third aspect of the present invention, there is provided an image matching system for matching a first image and a second image, comprising a converting means for performing image conversion processing based on a distance from a reference position in each of the first image and second image and an angle formed by a straight line passing through the reference position and a reference axis including the reference position and generating a first converted image and a second converted image in a two-dimensional space defined by the distance and the angle and a matching means for performing matching processing of the first image against the second image based on results of the correlation processing at a plurality of different relative locations in a first direction and a second direction orthogonal to the first direction in the first converted image and second converted image generated at the converting means.

Preferably, the converting means performs image conversion processing of converting points in each image to patterns of curves based on the distance from the reference position to the closest point on a straight line passing through the points in the image and an angle formed by the straight line passing through the reference position and the closest point and the reference axis including the reference position and converting the linear components in each image to patterns of a plurality of overlapped curves to generate the first converted image and second converted image.

According to the present invention, each of the first step, the first routine, and the converting means performs the image conversion processing based on the distance from a reference position in each of the first image and second image and an angle formed by the straight line passing through the reference position and the reference axis including the reference position to generate the first converted image and second converted Image in the two-dimensional space defined by the distance and the angle. Each of the second step, the second routine, and the matching means performs the matching processing of the first image and second image based on results of the correlation processing at a plurality of different relative locations in the first direction and the second direction orthogonal to the first direction in the first converted image and second converted image generated.

BRIEF DESCRIPTION OF THE DRAWINGS

These and other objects and features of the present invention will become clearer from the following description of the preferred embodiments given with reference to the attached drawings, wherein:

FIG. 2 is a software-like functional block diagram of the image matching system shown in FIG. 1;

FIGS. 4A to 4F are diagrams for explaining the operation of the conversion unit shown in FIG. 2, wherein FIG. 4A is a diagram of a sample image va1, FIG. 4B is a diagram of an image va2 obtained by rotating the image va1 shown in FIG. 4A by exactly a predetermined angle θ, FIG. 4C is a diagram of an image va3 obtained by moving the image va2 shown in FIG. 4B in parallel; FIG. 4D is a diagram of an image hva1 obtained by applying image conversion processing to the image va1 shown in FIG. 4A; FIG. 4E is a diagram of an image hva2 obtained by applying image conversion processing to the image va2 shown in FIG. 4B, and FIG. 4F is a diagram of an image hva3 obtained by applying image conversion processing to the image va3 shown in FIG. 4C;

FIGS. 7A to 7C are diagrams for explaining the correlation value of a correlation strength image G(p,q), wherein FIGS. 7A and 7B are diagrams of signals S1621 and S1622 as converted images and FIG. 7C is a diagram of a strength peak of the correlation strength image G(p,q);

DESCRIPTION OF THE PREFERRED EMBODIMENTS

Figure 1:
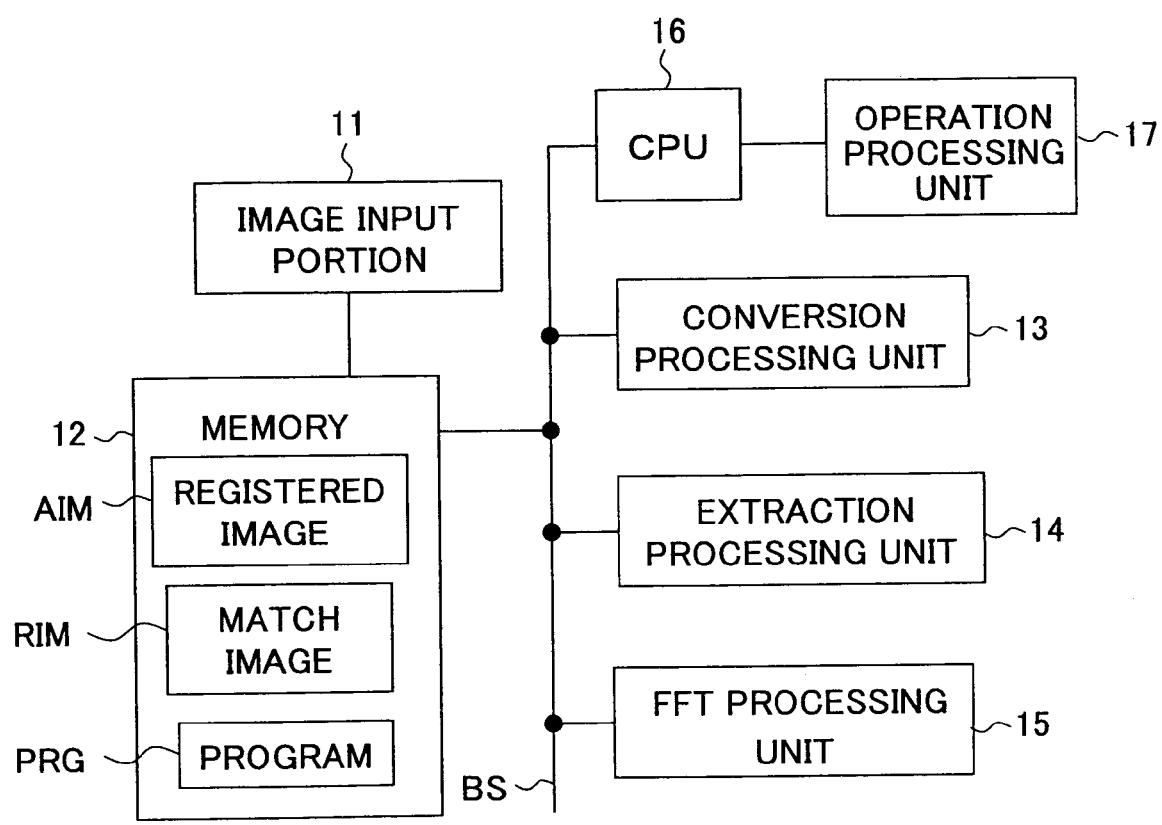
FIG. 1 is a hardware-like functional block diagram of an image matching system according to a first embodiment of the present invention.

FIG. 1 is a hardware-like functional block diagram of an image matching system according to a first embodiment of the present invention. An image matching system (information processing apparatus) 1 according to the present embodiment, for example, as shown in FIG. 1, has an image input portion 11, a memory 12, a conversion processing unit 13, an extraction processing unit 14, a fast Fourier transform (FFT) processing unit 15, a central processing unit (CPU) 16, and an operation processing unit 17. For example, the image input portion 11 is connected to the memory 12. The memory 12, the conversion processing unit 13, the extraction processing unit 14, the FFT processing unit 15, and the CPU 16 are connected by a bus BS.

The image input portion 11 is an input portion for receiving input of an image from the outside. For example, the image input portion 11 receives as input a registered image AIM and an image to be compared against the registered image AIM (also referred to as a "match image RIM"). The memory 12 stores for example images input from the image input portion 11 therein. Further, for example, the memory 12 stores the registered image AIM, the match image RIM, the program PRG, etc. as shown in FIG. 1. The program PRG is run by for example the CPU 16 and includes routines for realizing functions relating to conversion processing, correlation processing, matching processing, etc. according to the present invention.

The conversion processing unit 13 performs image conversion processing explained later under the control of the CPU 16 and outputs processing results to the CPU 16. The conversion processing unit 13 preferably uses a dedicated circuit configured by hardware in order to perform for example the image conversion processing at a high speed.

The extraction processing unit 14 performs the extraction processing explained later (also referred to as "masking processing") under the control of the CPU 16 and outputs the processing results to the CPU 16. The extraction processing unit 14 preferably uses a dedicated circuit configured by hardware in order to perform for example extraction processing at a high speed.

The fast Fourier transform (FFT) processing unit 15 performs two-dimensional Fourier transform processing based on images stored by the memory 12 under the control of for example the CPU 16 and outputs processing results to the CPU 16 etc.

The operation processing unit 17 performs predetermined processing for releasing an electronic lock etc. when for example a registered image AIM matches the match image RIM based on the results of the processing of the CPU 16 explained later.

The CPU 16 performs the matching processing according to the embodiment of the present invention based on for example a program PRG stored in the memory 12, the registered image AIM, and the match image RIM. Further, the CPU 16 controls the image input portion 11, the memory 12, the conversion processing unit 13, the extraction processing unit 14, the FFT processing unit 15, the operation processing unit 17, etc. to realize the processing according to the present embodiment.

FIG. 2 is a software-like functional block diagram of the image matching system shown in FIG. 1. For example, the CPU 16 running the program PRG in the memory 12, as shown in FIG. 2, realizes functions of a conversion unit 161, an extraction unit 162, a correlation value generation unit 163, and a matching unit 164. The conversion unit 161 corresponds to the converting means according to the present invention, while the correlation value generation unit 163 and the matching unit 164 correspond to the matching means according to the present invention.

The conversion unit 161 makes the conversion processing unit 13 for performing the dedicated image processing in terms of for example hardware execute the image conversion processing. In more detail, for example the conversion unit 161 performs the image conversion processing based on the registered image AIM and outputs the processing result as the signal S1611. Further, the conversion unit 161 performs the image conversion processing based on the match image RIM and outputs the processing result as the signal S1612.

Figure 3A:
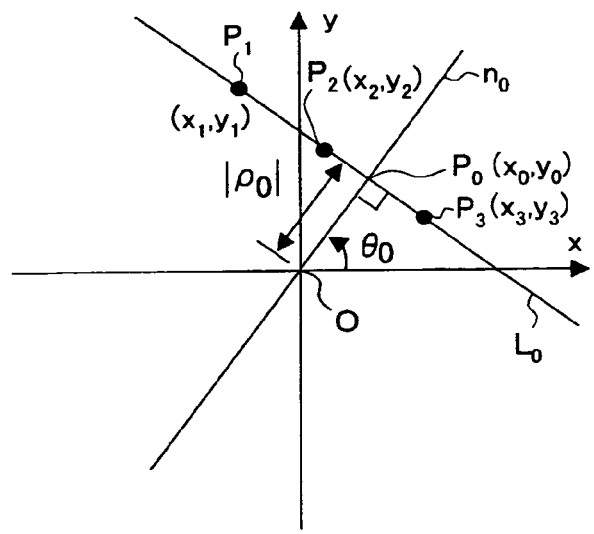
FIGS. 3A and 3B are diagrams for explaining the operation of a conversion unit shown in FIG. 2.
Figure 3B:
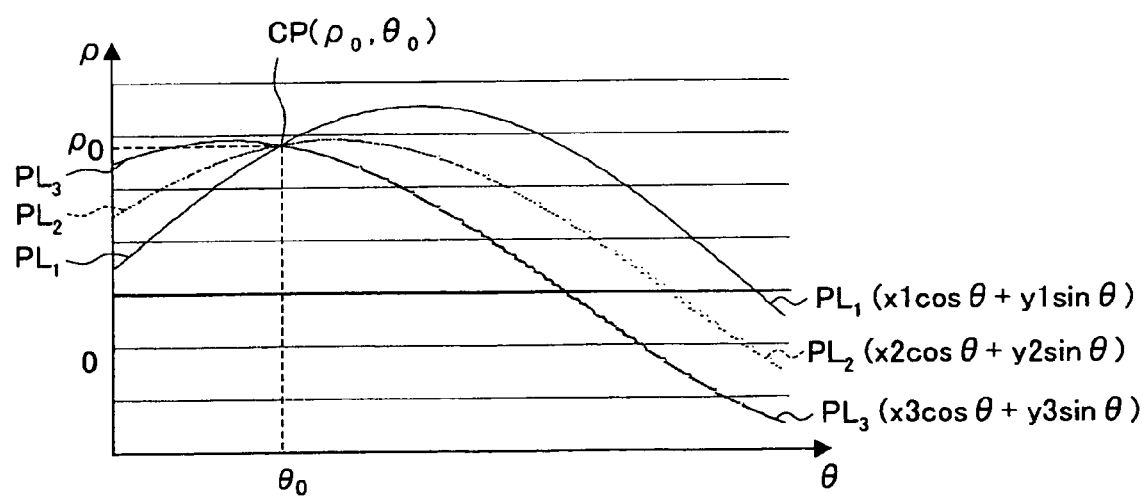
Figure 5A:
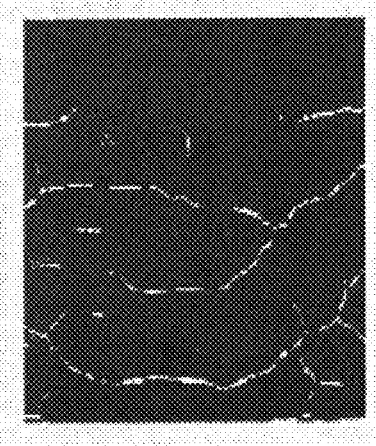
FIGS. 5A to 5F are diagrams for explaining the operation of the conversion unit shown in FIG. 2.
Figure 5B:
Figure 5C:
Figure 5D:
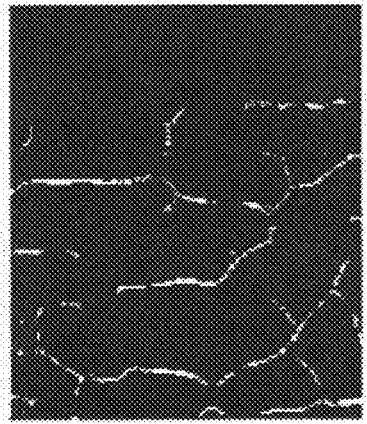
Figure 5E:
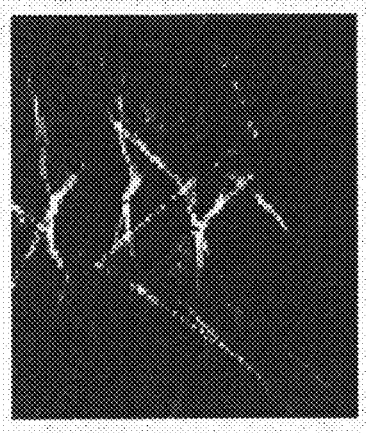
Figure 5F:
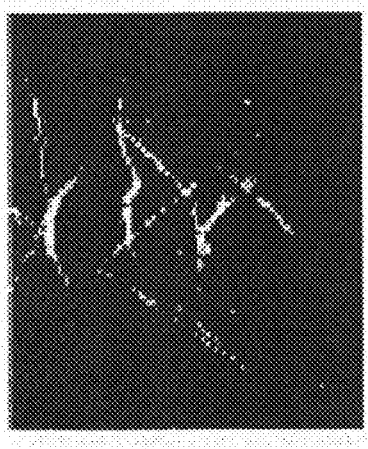

FIGS. 3A and 3B are diagrams for explaining the operation of the conversion unit shown in FIG. 2. The conversion unit 161 performs image conversion processing based on for example the distance from a reference position in each of the first image and the second image and an angle formed by a straight line passing through the reference position and a reference axis including the reference position to generate a first converted image and second converted image in the two-dimensional space defined by the distance and the angle.

In more detail, the conversion unit 161 performs the image processing for converting points in each image to patterns of curves based on a distance ρ0 from the reference position O to the closest point P0 on a straight line L0 passing through the points in the image and an angle θ0 formed by a straight line n0 passing through the reference position O and the closest point P0 and the reference axis including the reference position O and converting the linear components in the image to a plurality of patterns of overlapped curves to generate the first converted image and second converted image.

For a simple explanation, for example, as shown in FIG. 3A, assume that the straight line L0 and a point P1(x1,y1), a point P2(x2,y2), and a point p3(x3,y3) on the straight line L0 exist on an x-y plane. If the straight line passing through the origin (reference position) O and vertical to the straight line L0 is n0, for example, the straight line n0 and the x-axis serving as the reference axis have the relationship of the angle θ0. There is a relationship in the distance |ρ0| from the origin O to the straight line L0. Here, |ρ0| indicates an absolute value of ρ0. The straight line L0 can be realized by a parameter such as (ρ0,θ0). The image conversion processing according to the present invention performed on the coordinates (x,y) on the x-y plane is defined by for example equation (1):

$$\rho = x \cdot \cos\theta + y \cdot \sin\theta \quad (1)$$

For example, when performing the conversion processing shown in equation (1) for each of the points P1, P2, and P3, the points are converted to curves in the ρ-θ space as shown in FIG. 3B. In more detail, the conversion processing is for converting the point P1(x1,y1) to a curve PL1(x1·cos θ+y1·sin θ), converting the point P2(x2,y2) to a curve PL2 (x2·cos θ+y2·sin θ), and converting the point P3(x3,y3) to a curve PL3(x3·cos θ+y3·sin θ). The patterns of these curves PL1, PL2, and PL3 cross at a crossing point CP (ρ0,θ0) in the ρ-θ space. In the ρ-θ space, the cross point CP (ρ0,θ0) corresponds to the linear component L0 on the x-y plane. Conversely, as shown in FIG. 3A, the linear component L0 on the x-y plane corresponds to the crossing point CP of patterns PL1, PL2, and PL3 in the ρ-θ space.

As explained above, image conversion processing for digitalization is carried out. It can be decided according to the degree of overlapping of the patterns of curves in the ρ-θ space of the processing result which linear component is dominant on the x-y plane before the conversion. The rotation and parallel movement of the image on this x-y plane correspond to parallel movements in the θ direction and the ρ direction in the ρ-θ space after the image conversion processing.

FIGS. 4A to 4F are diagrams for explaining the operation of the conversion unit shown in FIG. 2. FIG. 4A is a diagram of a sample image va1, FIG. 4B is a diagram of an image va2 obtained by rotating the image va1 shown in FIG. 4A by exactly a predetermined angle θ, and FIG. 4C is a diagram of an image va3 obtained by moving the image va2 shown in FIG. 4B in parallel. For example, in FIGS. 4A to 4C, the x-axis is plotted on the ordinate, and the y-axis is plotted on the abscissa. FIG. 4D is a diagram of an image hva1 obtained by applying image conversion processing to the image va1 shown in FIG. 4A; and FIG. 4E is a diagram of an image hva2 obtained by applying image conversion processing to the image va2 shown in FIG. 4B. FIG. 4F is a diagram of an image hva3 obtained by applying image conversion processing to the image va3 shown in FIG. 4C. For example, in FIGS. 4D to 4F, a ρ-axis is plotted on the ordinate, and a θ-axis is plotted on the abscissa.

When the conversion unit 161 applies image conversion processing as shown in for example FIG. 4A to the image va1 including the straight lines La1 and La2, it generates an image hva1 including the two points by the overlapping of the curve patterns in the image indicating the ρ-θ space as shown in FIG. 4D. For a simple explanation, only the points having a large degree of overlapping of curve patterns are shown. When the conversion unit 161 applies image conversion processing as shown in FIG. 4B to the image va2 obtained by rotating the image va1 by exactly a predetermined angle θ, it generates an image hva2 shown in FIG. 4E. This image hva2 is moved in parallel in the θ direction by exactly an amount in accordance with the rotation angle θ in the image indicating the ρ-θ space in comparison with the image hva1 shown in FIG. 4D. When the conversion unit 161 applies image conversion processing as shown in FIG. 4C to an image va3 obtained by moving the image va2 in parallel by exactly a predetermined amount, it generates an image hva3 shown in FIG. 4F. This image hva3 moves in parallel in the ρ direction by exactly an amount in accordance with the amount of parallel movement in the image indicating the ρ-θ space in comparison with the image hva2 shown in FIG. 4E. From the above characteristic features, by calculating the degree of correlation by detecting the amount of parallel movement between images after the image conversion processing, it is possible to perform the matching considering the rotation angle and parallel movement of the image before the image conversion processing.

FIGS. 5A to 5F are diagrams for explaining the operation of the conversion unit shown in FIG. 2. The conversion unit 161 performs the image conversion processing on the registered image AIM shown in for example FIG. 5A, generates the image S1611 shown in FIG. 5C, performs the image conversion processing on the match image RIM shown in FIG. 5B, and generates the image S1612. Values in accordance with the degrees of overlapping of patterns of curves are set in pixels in the images S1611 and S1612. Among images indicated by the predetermined halftones in the present embodiment, the higher the degree of overlapping of patterns of curves, the whiter the displayed image. As will be explained later, the matching unit 164 performs the matching processing based on this degree of overlapping of curve patterns, so performs the matching processing based on the linear components in the original x-y space.

The extraction unit 162 extracts a region having a degree of overlapping of patterns of curves in one converted image more than a threshold value set in advance for each of the first converted image and second converted image. In more detail, for example the extraction unit 162 extracts a region having a degree of overlapping of patterns of curves in one converted image more than a threshold value set in advance based on the signal S1611 of the first converted image shown in FIG. 5C, generates the image signal S1621 shown in FIG. 5E, and outputs the same to the correlation value generation unit 163. Further, for example, the extraction unit 162 extracts a region having a degree of overlapping of patterns of curves in one converted image more than a threshold value set in advance based on the signal S1612 of the second converted image shown in FIG. 5D, generates the image signal S1622 shown in FIG. 5F, and outputs the same to the correlation value generation unit 163. By performing this extraction processing, a noise component different from the linear component in the x-y space of for example the registered image AIM and the match image RIM, for example, a point component, is eliminated. For example, the extraction unit 162 makes the extraction processing unit 14 for performing the dedicated extraction processing (also referred to as the masking processing) in terms of for example hardware execute the extraction processing (masking processing) as the above extraction processing.

The correlation value generation unit 163 performs the matching processing of the first image and second image based on results of the correlation processing at a plurality of different relative locations in a first direction and a second direction orthogonal to the first direction based on the signals S1621 and S1622 of the first converted image and the second converted image. Here, the first direction and the second direction indicate the x-axis direction and the y-axis direction (or the θ-axis direction and the ρ-axis direction) in the converted images.

In more detail, the correlation value generation unit 163 generates a correlation value based on the degree of overlapping of patterns in the first converted image and the second converted image and coincidence/incoincidence of patterns in the first converted image and second converted image based on the signals S1621 and S1622 of the first and second converted images and outputs the generated correlation value as a signal S163 to the matching unit 164.

Figure 6:
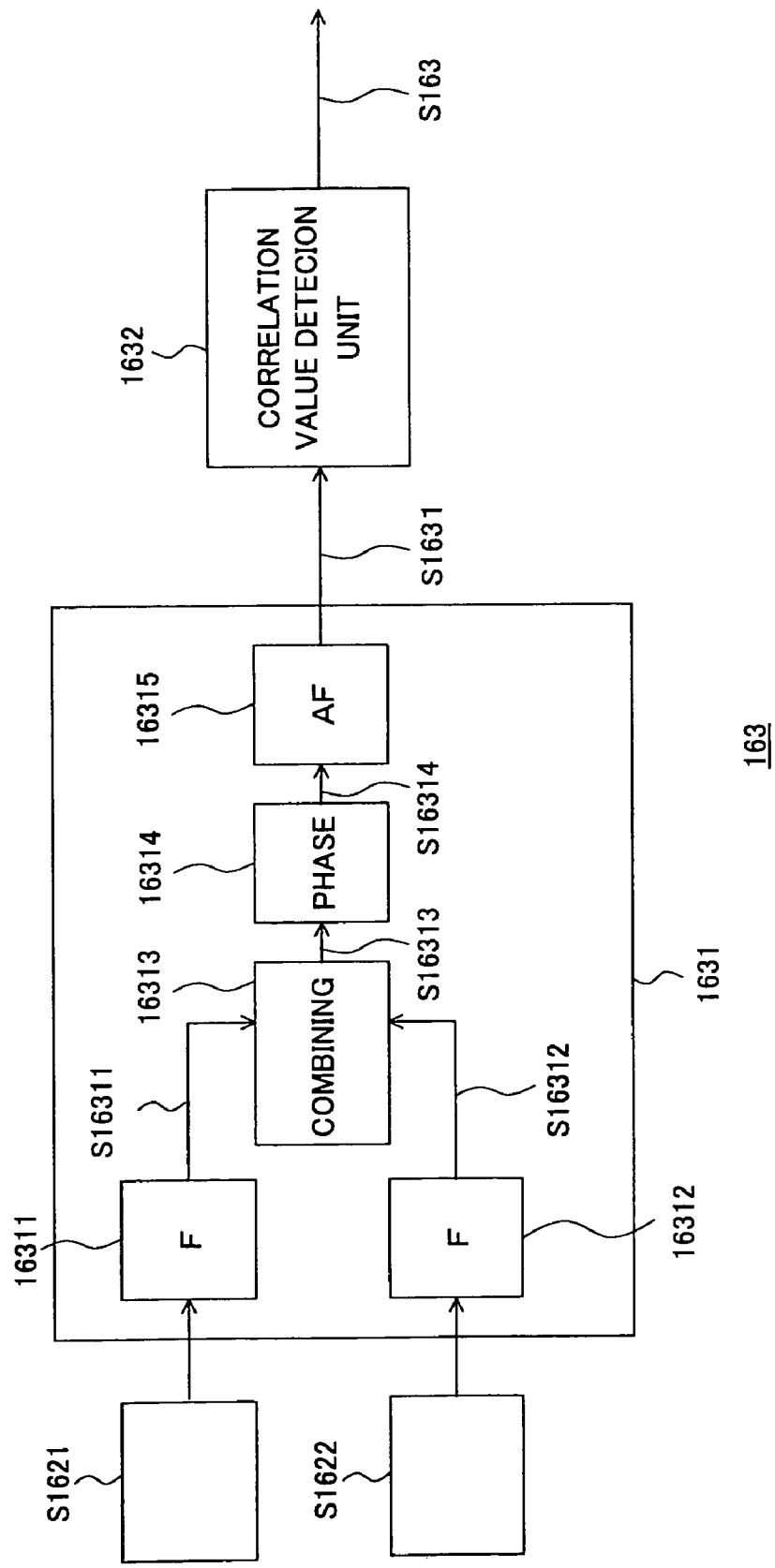
FIG. 6 is a functional block diagram of a concrete example of a correlation value generation unit shown in FIG. 2.

FIG. 6 is a functional block diagram of a concrete example of the correlation value generation unit 163 shown in FIG. 2. The correlation value generation unit 163, as shown in for example FIG. 6, has a correlation unit 1631 and a correlation value detection unit 1632. The correlation unit 1631 performs the correlation processing using for example a phase limitation filter based on the signals S1621 and S1622 and outputs the processing result as a signal S1631 to the correlation value detection unit 1632. The correlation unit 1631, for example as shown in FIG. 6, has Fourier transform units 16311 and 16312, a combining unit 16313, a phase extraction unit 16314, and an inverse Fourier transform unit 16315.

The Fourier transform unit 16311 applies a Fourier transform to the signal S1621 as shown in equation (2) in a case of for example an image pA(m,n) of M×N pixels, generates Fourier image data X(u,v), and outputs the same as a signal S16311 to the combining unit 16313. The Fourier transform unit 16312 applies the Fourier transform as shown in equation (3) to the signal S1622 in a case of for example an image pB(m,n) of M×N pixels, generates Fourier image data Y(u,v), and outputs the same as a signal S16312 to the combining unit 16313.

The Fourier image data X(u,v) is comprised of an amplitude spectrum C(u,v) and a phase spectrum θ(u,v) as shown in equation (2), while the Fourier transform image data Y(u,v) is comprised of an amplitude spectrum D(u,v) and a phase spectrum φ(u,v) as shown in equation (3).

$$X(u,v) = \sum_{m=0}^{N-1}\sum_{n=0}^{N-1} pA(m,n)e^{-j2\pi((mu+nv)/N)} \quad (2)$$
$$= C(u,v)e^{j\theta(u,v)}$$

$$Y(u,v) = \sum_{m=0}^{N-1}\sum_{n=0}^{N-1} pB(m,n)e^{-j2\pi((mu+nv)/N)} \quad (3)$$
$$= D(u,v)e^{j\phi(u,v)}$$

The combining unit 16313 combines the data X(u,v) and Y(u,v) generated at the Fourier transform units 16311 and 16312 and finds the correlation. For example, the combining unit 16313 generates X(u,v)·Y*(u,v) and outputs the same to the phase extraction unit 16314. Here, Y*(u,v) is a complex conjugate of Y(u,v).

The phase extraction unit 16314 eliminates the amplitude component based on the combined signal output from the combining unit 16313 and extracts the phase information. For example, the phase extraction unit 16314 extracts the phase component Z(u,v)=exp{j(θ(u,v)−φ(u,v))} based on X(u,v)·Y*(u,v).

The extraction of the phase information is not limited to the above format. For example, it is also possible to combine only the phase components as shown in equation (6) after extracting the phase information based on equations (4) and (5) based on the outputs of the Fourier transform units 16311 and 16312 and generate Z(u,v).

$$X'(u,v)=e^{j\theta(u,v)} \quad (4)$$

$$Y'(u,v)=e^{j\phi(u,v)} \quad (5)$$

$$Z(u,v)=X'(u,v)(Y'(u,v))^{*}=e^{j(\theta(u,v)-\phi(u,v))} \quad (6)$$

The inverse Fourier transform unit 16315 performs the inverse Fourier transform processing based on the signal Z(u,v) of only the phase information output from the phase extraction unit 16314 to generate a correlation strength image. In more detail, the inverse Fourier transform unit 16315 performs the inverse Fourier transform processing based on the signal Z(u,v) as shown in equation (7), generates the correlation strength image G(p,q), and outputs the same as the signal S1631 to the correlation value detection unit 1632.

$$G(p,q) = \sum_{u=0}^{N-1}\sum_{v=0}^{N-1} (Z(u,v))e^{j2\pi((up+vq)/N)} \quad (7)$$
$$= \sum_{u=0}^{N-1}\sum_{v=0}^{N-1} (e^{j(\theta(u,v)-\phi(u,v))})e^{j2\pi((up+vq)/N)}$$

The correlation value detection unit 1632 detects a correlation value based on for example the peak strength in the correlation strength image G(p,q) based on the signal S1631 output from the correlation unit 1631 and outputs the detected correlation value as the signal S163 to the matching unit 164. For example, the correlation value detection unit 1632 defines the largest peak strength in the correlation strength image G(p,q) as the correlation value.

Figure 7C:
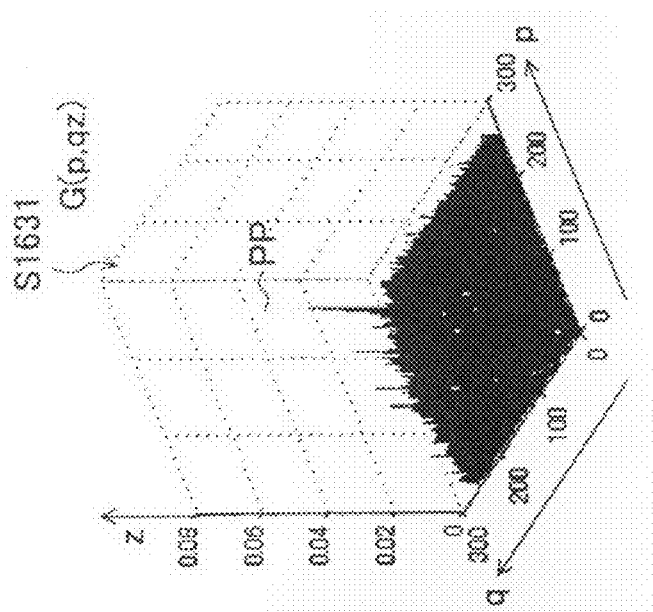
Figure 7B:
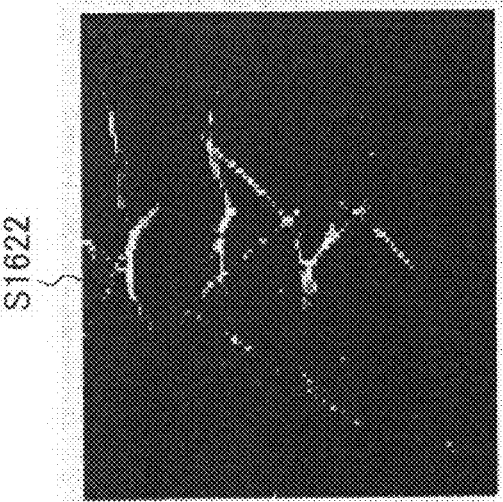
Figure 7A:
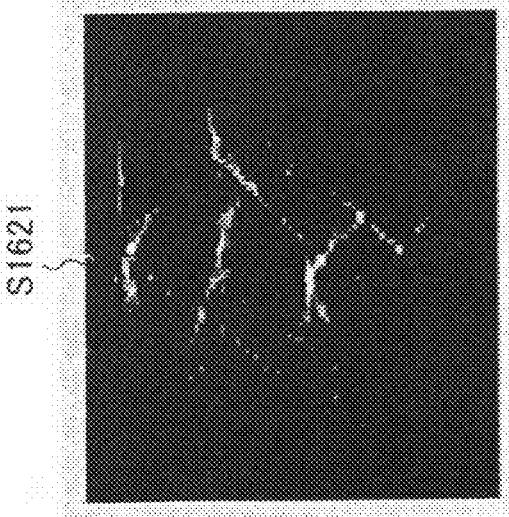
Figure 8:
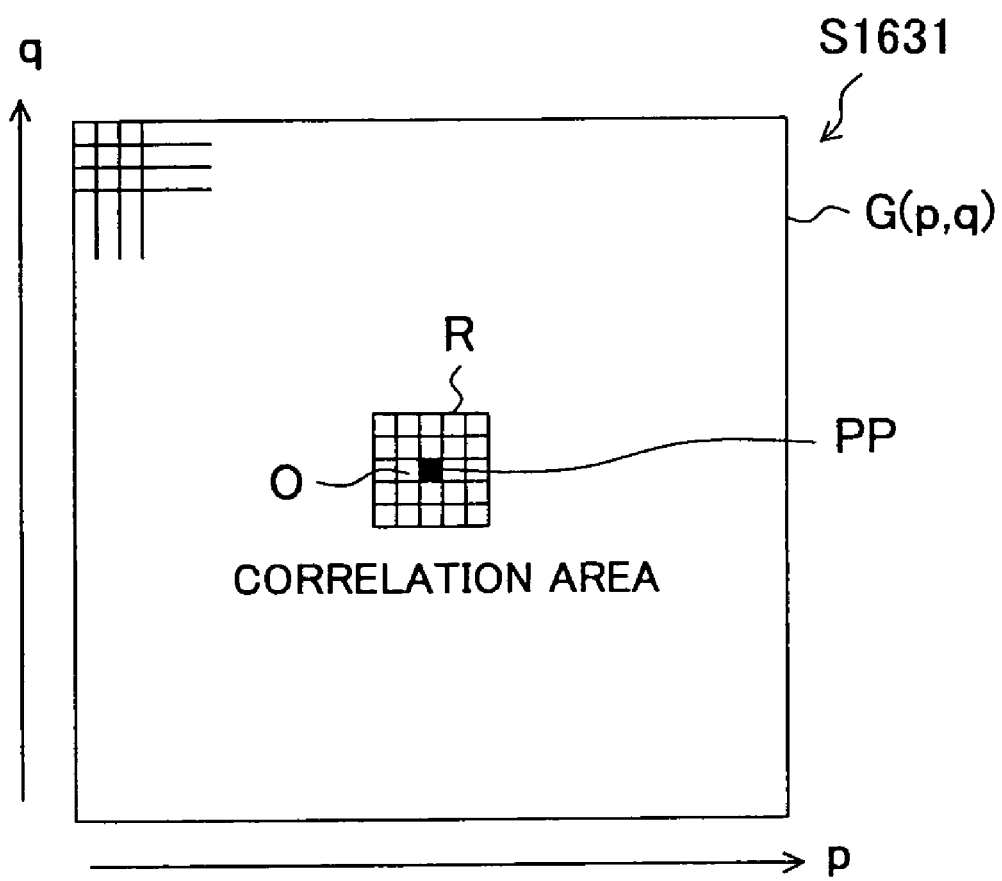
FIG. 8 is a diagram for explaining the correlation strength image G(p,q)

FIGS. 7A to 7C are diagrams for explaining a correlation value of the correlation strength image G(p,q). FIGS. 7A and 7B are diagrams showing signals S1621 and S1622 of the converted images; and FIG. 7C is a diagram of the strength peak of the correlation strength image G(p,q). FIG. 8 is a diagram for explaining the correlation strength image G(p,q). For example, the correlation value generation unit 163 performs correlation processing based on the images S1621 and S1622 as shown in for example FIGS. 7A and 7B, generates the correlation strength image G(p,q) as shown in FIG. 7C, and outputs the same as the signal S1631. In FIG. 7C, the z-axis indicates the correlation strength at the point (p,q). The correlation value detection unit 1632 outputs the correlation strength of the peak PP having the largest correlation strength as the correlation value signal S163 to the matching unit 164. When there is no rotation offset and parallel movement offset between for example the images S1621 and S1622, the correlation strength image S1631 is set so that the peak PP having the large correlation strength is formed at the image center position O of the correlation strength image S1631 as shown in FIG. 8. When there is rotation offset or parallel movement offset between the images S1621 and S1622, the correlation strength image S1631 is set so that the peak PP is formed offset by exactly an amount in accordance with the rotation offset or parallel movement offset from the image center position O thereof.

When the correlation strength image is generated by the above correlation processing, even when there is rotation offset or parallel movement offset between the images S1621 and S1622, the correlation peak can be found as the correlation value based on the correlation strength image.

The matching unit 164 matches the registered image AIM and the match image RIM based on the signal S163 indicating the correlation value output from the correlation value generation unit 163. In more detail, when a correlation value is larger than the predetermined threshold value, the matching unit 164 decides that a registered image AIM and the match image RIM coincide, while when the correlation value is less than the threshold value, it decides that they do not coincide. For example, when applying the image matching system according to the present embodiment to a vein pattern matching system in the security field, the CPU 16 makes the operation processing unit 17 perform predetermined processing such as unlocking of an electronic lock in accordance with the matching result of the matching unit 164.

Figure 9:
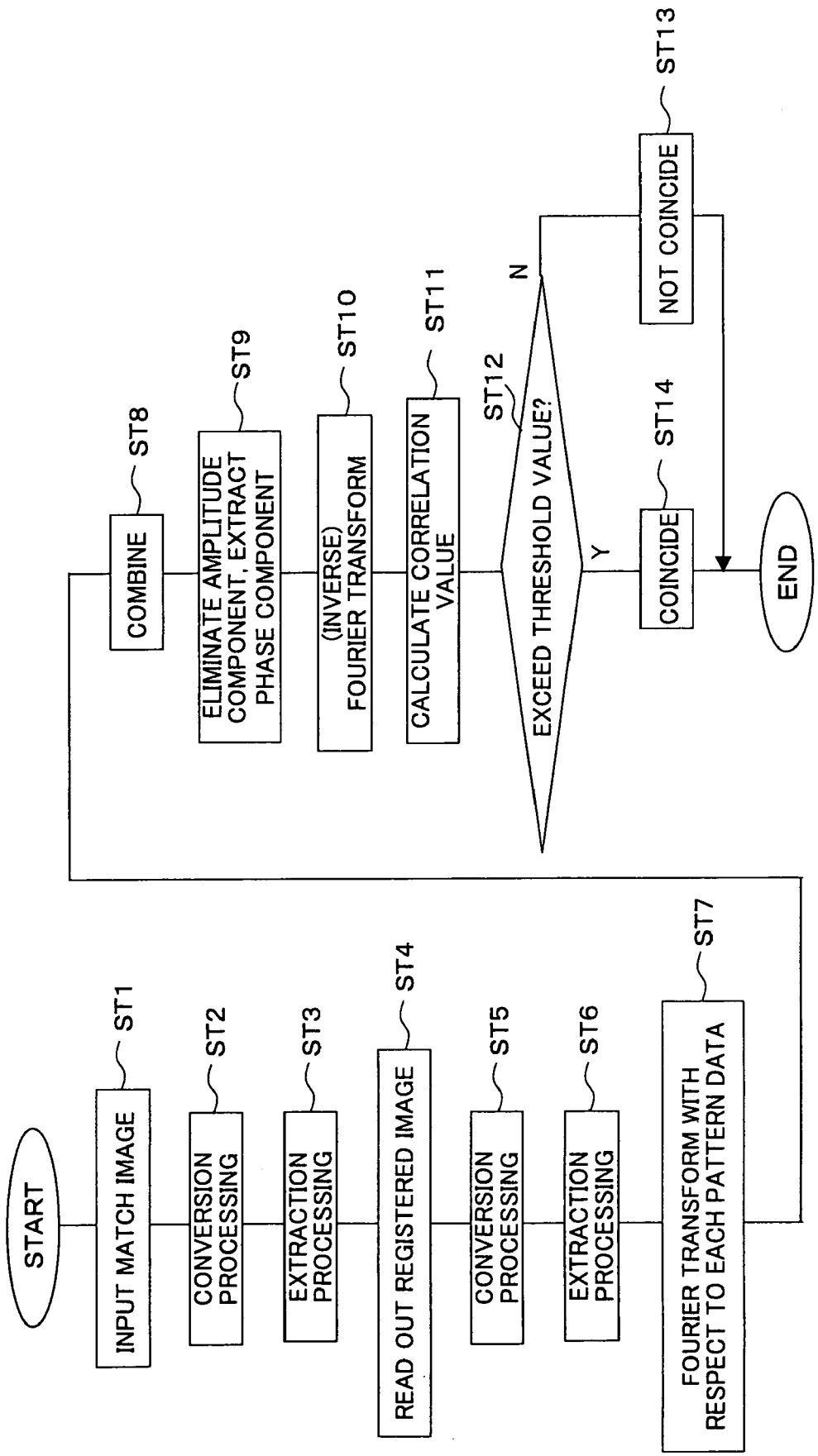
FIG. 9 is a flow chart for explaining the operation of the image matching system shown in FIG. 1.

FIG. 9 is a flow chart for explaining the operation of the image matching system shown in FIG. 1. The operation of the image matching system 1 will be explained focusing on the operation of the CPU 16 by referring to FIGS. 3A and 3B, FIGS. 5A to 5F, and FIGS. 7A to 7C to FIG. 9.

For example, the registered image AIM is input from the image input portion 11 in advance and stored in the memory 12. At step ST1, the match image RIM is input from the image input portion 11 and stored in the memory 12. At step ST2, the conversion unit 161 performs the image processing for converting points in the image to patterns of curves PL based on a distance $\rho 0$ from a reference position O to the closest point P0 on the straight line L0 passing through the point in the image and the angle $\theta$ formed by the straight line n0 passing through the reference position O and the closest point P0 and the x-axis as the reference axis including the reference position O as shown in FIG. 3A based on for example the match image RIM shown in FIG. 5B and converting the linear component L in the image to patterns of a plurality of overlapped curves PL and generates the signal S1612 as the converted image on the $\rho$-$\theta$ space as shown in for example FIG. 5D.

At step ST3, the extraction unit 162 performs the extraction processing (masking processing) for a region having the degree of overlapping of patterns of curves in one converted image more than the threshold value set in advance based on the converted image S1612. In more detail, as mentioned above, in each pixel in the image S1612, a value in accordance with the degree of overlapping of patterns of curves is set. Among the images indicated by the predetermined halftone, the higher the degree of overlapping of the patterns of curves, the whiter the displayed image. For example, the extraction unit 162 extracts a region having a degree of overlapping of patterns of curves in the converted image S1612 shown in FIG. 5F more than the threshold value set in advance, generates the image S1622 shown in for example FIG. 5E, and outputs the same to the correlation value generation unit 163.

At step ST4, the CPU 16 reads out a registered image AIM stored in the memory 12. At step ST5, the conversion unit 161 performs the image processing for converting points in the image to patterns of curves PL based on the distance $\rho 0$ from the reference position O to the closest point P0 on the straight line L0 passing through the points in the image and the angle $\theta$ formed by the straight line n0 passing through the reference position O and the closest point P0 and the x-axis as the reference axis including the reference position O as shown in FIG. 3A based on for example the registered image AIM shown in FIG. 5A and converting the linear components L in the image to patterns of a plurality of overlapped curves PL and generates the signal S1611 as the converted image on the $\rho$-$\theta$ space as shown in for example FIG. 5C.

Steps ST1 to ST5 correspond to the first step of performing the image conversion processing based on the distance from the reference positions in each of the first image and the second image and the angle formed by the straight line passing through the reference position and the reference axis including the reference position and generating the first converted image and the second converted image in the two-dimensional space defined by the distance and the angle according to the present invention.

At step ST6, the extraction unit 162 performs the extraction processing (masking processing) for a region having a degree of overlapping of patterns of curves in one converted image more than the threshold value set in advance based on the converted image S1611. For example, the extraction unit 162 extracts a region having a degree of overlapping of patterns of curves in the converted image S1611 shown in FIG. 5C more than the threshold value set in advance, generates the image S1621 shown in for example FIG. 5E, and outputs the same to the correlation value generation unit 163.

The correlation value generation unit 163 generates the correlation value of the registered image AIM and the match image RIM based on the degree of overlapping of patterns in the converted image S1621 and the converted image S1622 and coincidence/incoincidence of the patterns in the converted image S1621 and the converted image S1622. In more detail, at step ST7, the Fourier transform units 16311 and 16312 of the correlation unit 1631 perform the Fourier transform processings as shown in for example equations (2) and (3) for the converted images S1621 and S1622 and outputs the processing results as signals S16311 and S16312 to the combining unit 16313.

The processings of steps ST1 to ST7 need not be in the above sequence either. For example, after the conversion unit 161 performs the conversion processing for the registered image AIM and the match image RIM, it is also possible to perform the extraction processing (masking processing) by the extraction unit 162 for the converted images.

At step ST8, the combining unit 16313 performs the combining processing as mentioned above based on the signals S16311 and S16312 and outputs the processing result as the signal S16313 to the phase extraction unit 16314. At step ST9, the phase extraction unit 16314 extracts only the phase component based on the signal S16313 and outputs the same as the signal S16314 to the inverse Fourier transform unit 16315.

At step ST10, the inverse Fourier transform unit 16315 performs the inverse Fourier transform processing based on the signal 516314 and outputs the same as the signal S1631 as shown in for example FIG. 7C to the correlation value detection unit 1632. The magnitude of the correlation strength peak of this correlation strength image S1631 indicates the degree of the correlation between the converted images after the image conversion. For example, when there is parallel movement offset between the converted images, the location of the correlation strength peak of the correlation strength image S1631 is offset from the center position O by exactly the amount corresponding to the amount of parallel movement offset between converted images, but does not exert an influence upon the correlation strength.

At step ST11, the correlation value detection unit 1632 defines the strength of the correlation strength peak PP as the correlation value and outputs the signal S163 to the matching unit 164.

At step ST12, the matching unit 164 performs the matching based on the signal S163 indicating tye correlation value from the correlation value detection unit 1632. In more detail, the matching unit 164 decides whether or not the correlation value is larger than the threshold value determined in advance and, when deciding the correlation value is larger, outputs a matching result signal S164 indicating that the registered image AIM and the match image RIM coincide (ST13). On the other hand, at step ST12, the matching unit 164, when deciding that the correlation value is smaller than the threshold value determined in advance, outputs the matching result signal S164 indicating that the registered image AIM and the match image RIM do not coincide (ST14) and ends the series of processings.

Steps ST7 to ST12 correspond to the second step of performing the matching processing of the first image and second image based on the results of correlation processing at a plurality of different relative locations in the first direction and the second direction orthogonal to the first direction in the first converted image and the second converted image generated in the first step according to the present invention.

As explained above, in the present embodiment, provision is made of the conversion unit 161 for performing the image conversion processing based on the distance from a reference position in each of the first image and second image and the angle formed by the straight line passing through the reference position and the reference axis including the reference position and generating the first converted image and the second converted image in the two-dimensional space defined by the distances and the angle, in more detail, the conversion unit 161 for performing the image processing based on the registered image AIM and the match image RIM for converting points in the image to patterns of curves PL based on the distance ρ from the reference position O to the closest point P0 of the straight line L passing through the point in the image and the angle θ formed by the straight line n0 passing through the reference position O and the closest point P0 and the x-axis as the reference axis including the reference position O and converting the linear components in the image to patterns of a plurality of overlapped curves PL and generating the converted images S1611 and S1612, the correlation value generation unit 163 for performing the correlation processing based on the converted images S1611 and S1612 and generating the correlation value S163, and the matching unit 164 for matching the registered image AIM and the match image RIM based on the signal S163 indicating the correlation value generated by the correlation value generation unit 163, therefore the matching of the images can be carried out with a high precision.

That is, the matching unit 164 performs the matching based on the degree of overlapping in patterns in the converted image S1611 and the converted image S1612 generated by the conversion unit 161 and coincidence/incoincidence of the patterns in the converted image S1611 and the converted image S1612, therefore can match images with a high precision. Further, even in the case where there is parallel movement offset or rotation angle offset between the registered image AIM and the match image RIM, the parallel movement offset and the rotation angle offset appear as parallel movement offset between the converted images S1611 and S1612 after the image conversion processing according to the present invention. In the correlation processing according to the present invention, even in the case where there is parallel movement offset between the converted images S1611 and S1612, the correlation value can be generated, and matching can be carried out with a simple processing.

For example, in general image matching processing, after performing the correction processing of the parallel movement offset and the rotation angle offset between the images to be matched, it is necessary to perform processing having a large load, for example, the matching processing is carried out in units of pixels, but in the image matching according to the present embodiment, it is not necessary to perform such correction processing, so the matching processing can be carried out with a low load and at a high speed.

Figure 10:
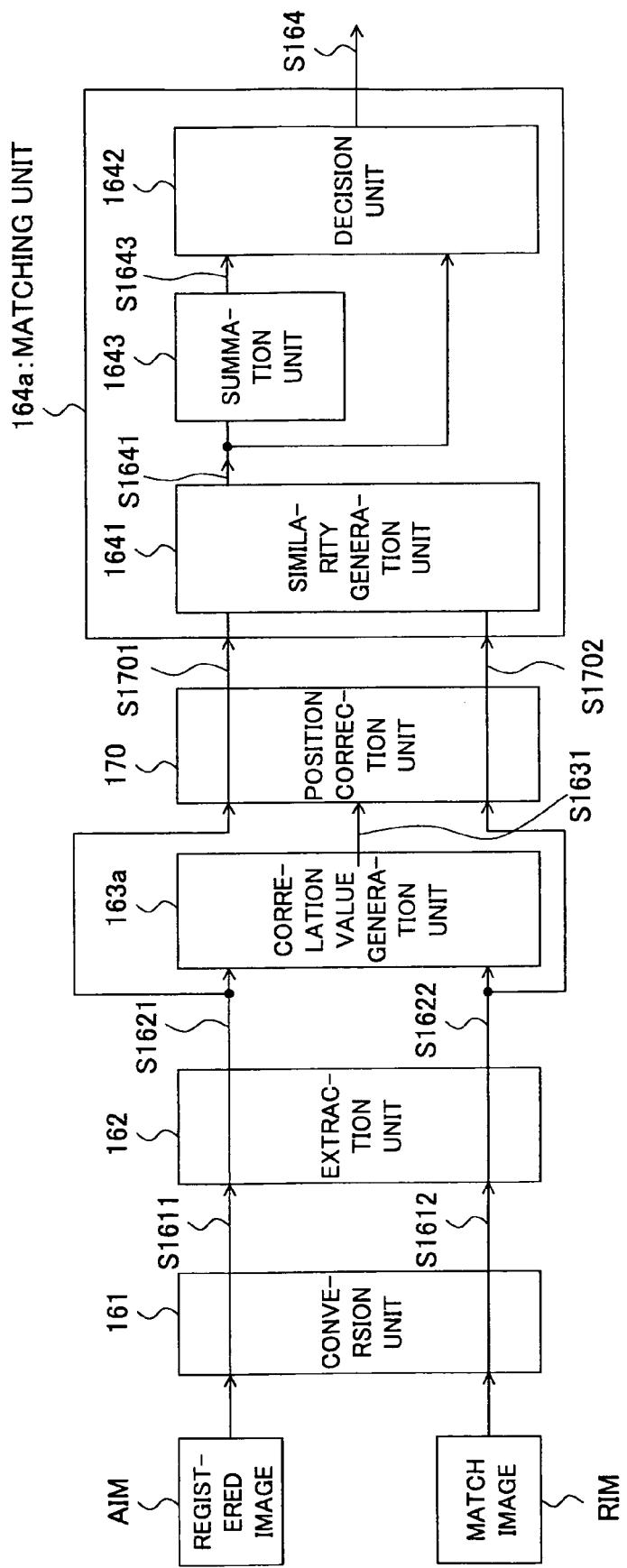
FIG. 10 is a functional block diagram of the image matching system according to a second embodiment of the present invention.

FIG. 10 is a functional block diagram of the image matching system according to a second embodiment of the present invention. An image matching system 1a according to the present embodiment performs Huff conversion processing based on the registered image AIM and the match image RIM, corrects the parallel movement offset of the converted images, generates the similarity as the correlation value between the converted images after the position correction, and performs the matching processing between the registered image AIM and the match image RIM based on the similarity.

The image processing apparatus 1a has the same components as those of the functional block diagram shown in FIG. 1 in terms of for example hardware, so the explanation will be omitted. The image processing apparatus 1a, in terms of software, for example as shown in FIG. 10, realizes the conversion unit 161, the extraction unit 162, a correlation value generation unit 163a, a position correction unit 170, and a matching unit 164a by executing the program PRG in the memory 12 by the CPU 16. The difference between the first embodiment and the second embodiment resides in the point that the position correction unit 170 is added, the point that the correlation value generation unit 163a outputs the signal S1631 used for the position correction processing, and the point that the function of the matching unit 164a is different. The components having the same functions between the first embodiment and the second embodiment are assigned the same notations, and explanations will be omitted.

The correlation value generation unit 163a performs the correlation processing based on the images S1621 and S1622 as shown in for example FIGS. 7A and 7B, generates the correlation strength image G(p,q) as shown in FIG. 7C, and outputs the same as the signal S1631.

The position correction unit 170 performs the position correction processing based on the signal S1631 output from the correlation value generation unit 163a and the signals S1621 and S1622 output from the extraction unit 162, that is, based on the patterns in the first converted image and the second converted image, and outputs the results of the position correction processing as a signal S1701 and a signal S1702 to the matching unit 164a.

Figure 11A:
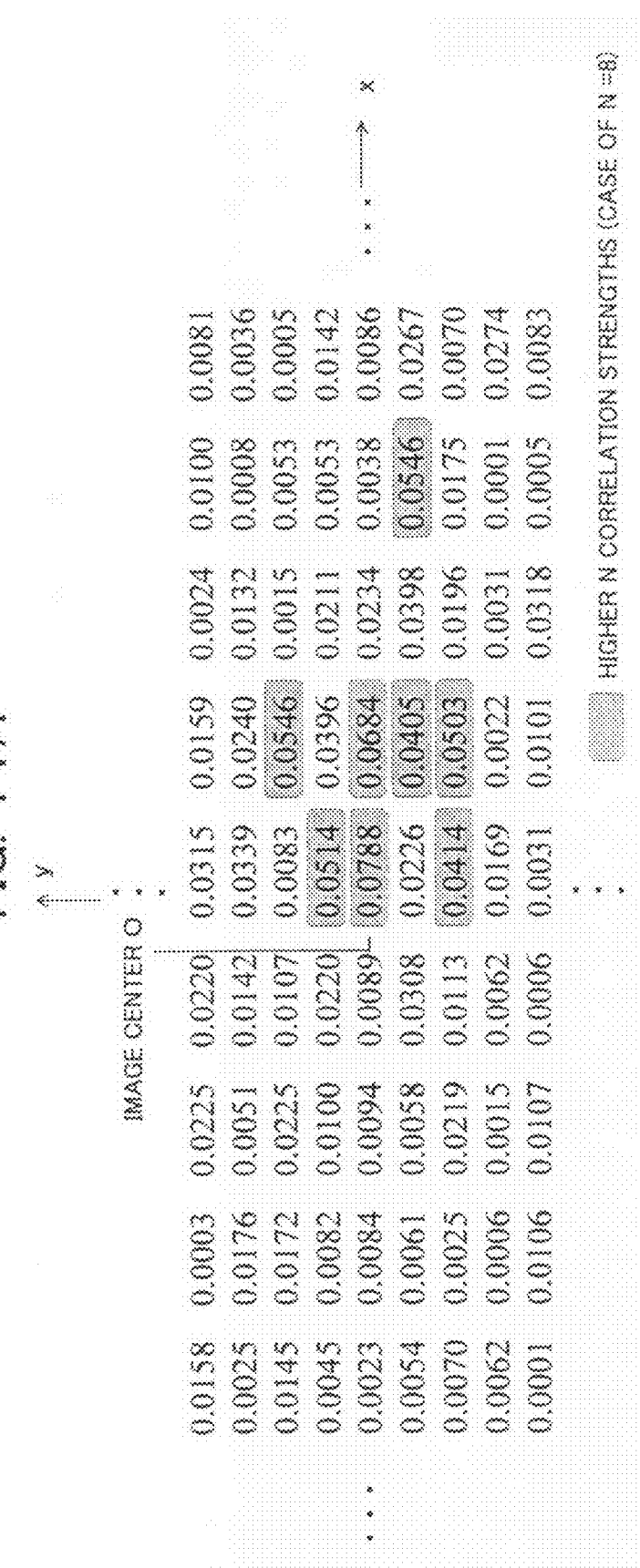
FIGS. 11A and 11B are diagrams for explaining the operation of a position correction unit shown in FIG. 10.
Figure 11B:
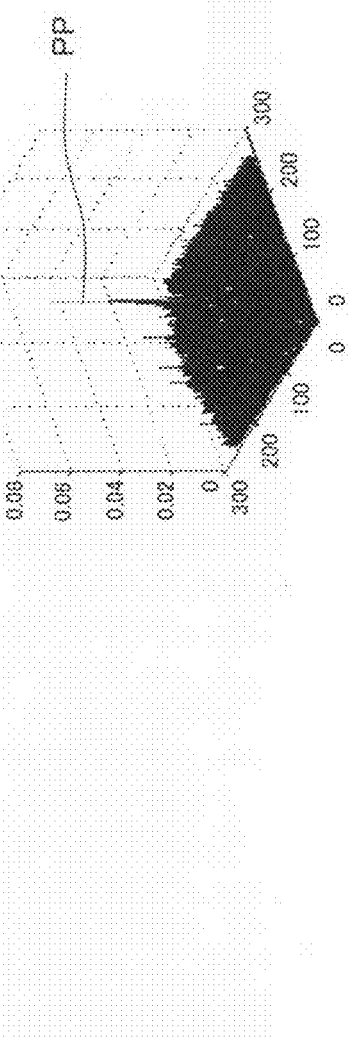

FIGS. 11A and 11B are diagrams for explaining the operation of the position correction unit shown in FIG. 10. The numerical values indicate the correlation peak strengths of the correlated image data on the X-Y plane of the correlated image data. For example, in the case of the registered image AIM and the match image RIM including the pattern of the digitalized linear component (linear shape), even between images having large correlation, the correlation peak strength (also referred to as the correlation strength) has the small value as shown in FIGS. 11A and 11B.

For example, the position correction unit 170 specifies N correlation values and correlation peak positions having higher correlation strengths, i.e., in the present embodiment, eight correlation values and correlation peak positions, as the candidates of positional relationships in the two dimensions between the registered image AIM and the match image RIM as shown in for example FIG. 11A. The position correction unit 170 performs the position correction by performing a plurality of position correction processings according to need, for example, parallel movement, so that the patterns between the registered image AIM and the match image RIM substantially coincide based on a plurality of correlation values and the correlation peak positions corresponding to them.

The matching unit 164a generates the correlation values based on patterns in two converted images and performs the matching processing between the registered image AIM and the match image RIM based on the generated correlation values and a threshold value set in advance. Further, the matching unit 164a performs the matching processing based on the sum of correlation values corresponding to different positions and the threshold value set in advance based on results of a plurality of position correction processings.

Figure 12A:
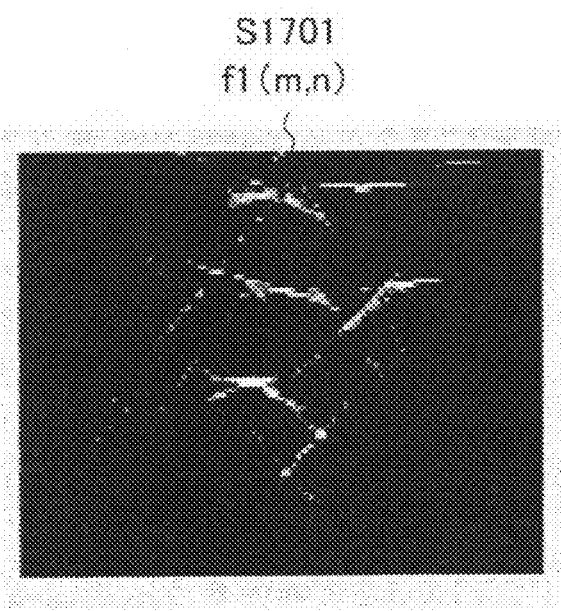
FIGS. 12A and 12B are diagrams for explaining the operation of a similarity generation unit.
Figure 12B:
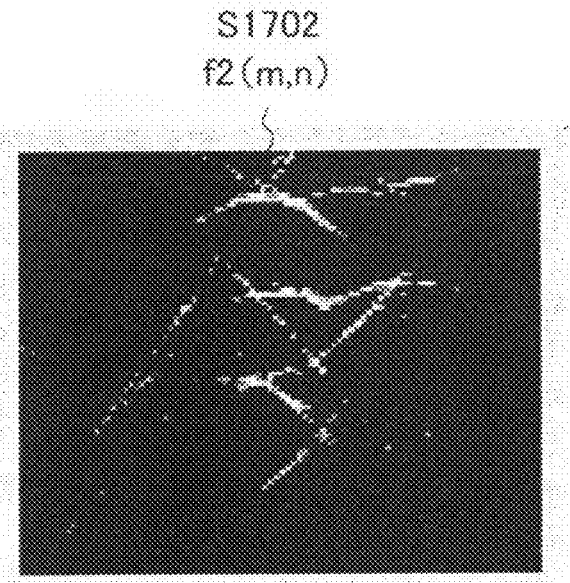

In more detail, the matching unit 164a has a similarity generation unit 1641, a decision unit 1642, and a summation unit 1643. FIGS. 12A and 12B are diagrams for explaining the operation of the similarity generation unit 1641. The similarity generation unit 1641 performs the comparison processing for each of for example a plurality of different positional relationships in the first converted image and the second converted image and generates the similarities as correlation values based on the results of the comparison processing. In more detail, the similarity generation unit 1641 performs the comparison processing for each of a plurality of different positional relationships in two images based on the signal S1701 and the signal S1702 as shown in for example FIGS. 12A and 12B and generates similarities as correlation values based on the results of the comparison processing.

For example, when the two images are f1(m,n) and f2(m,n), the similarity generation unit 1641 calculates for example the similarity Sim by equation (8) and outputs the calculation result as S1641.

$$Sim(f1, f2) = \frac{\sum_{m=0}^{M-1}\sum_{n=0}^{N-1} f1(m,n)f2(m,n)}{\sqrt{\left\{\sum_{m=0}^{M-1}\sum_{n=0}^{N-1} f1(m,n)^2\right\}} \sqrt{\left\{\sum_{m=0}^{M-1}\sum_{n=0}^{N-1} f2(m,n)^2\right\}}} \quad (8)$$

Figure 13A:
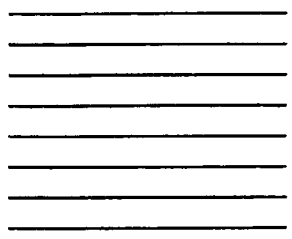
FIGS. 13A to 13C are diagrams for explaining the operation of the similarity generation unit shown in FIG. 10.
Figure 13B:
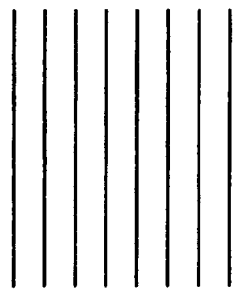
Figure 13C:
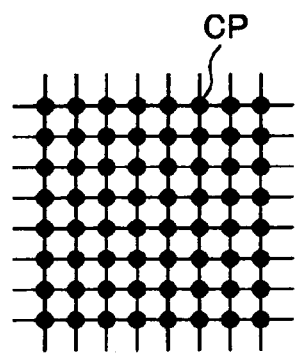

FIGS. 13A to 13C are diagrams for explaining the operation of the similarity generation unit shown in FIG. 10. When generating the similarity of two images including the linear components (also referred to as the linear shapes) shown in for example FIGS. 13A and 13B, the similarity generation unit 1641 generates similarity in accordance with the number of the cross points CP of the two images as shown in FIG. 13C. Here, for a simple explanation, the linear component are indicated by black pixels having a bit value '1', and the other components are indicated by white pixels having a bit value '0'.

The summation unit 1643 sums up the similarities Sim based on the signal S1641 and outputs the summation result as a signal S1643 to the decision unit 1642. The decision unit 1642 matches the registered image AIM and the match image RIM based on the signal S1641 indicating similarity generated by the similarity generation unit 1641. For example, when the similarity is larger than the predetermined value, the decision unit 1642 decides that the registered image AIM and the match image RIM coincide. Further, the decision unit 1642 decides that the registered image AIM and the match image RIM coincide when the signal S1643 of the summed up value of the similarities Sim from the summation unit 1643 is larger than a predetermined threshold value.

Figure 14:
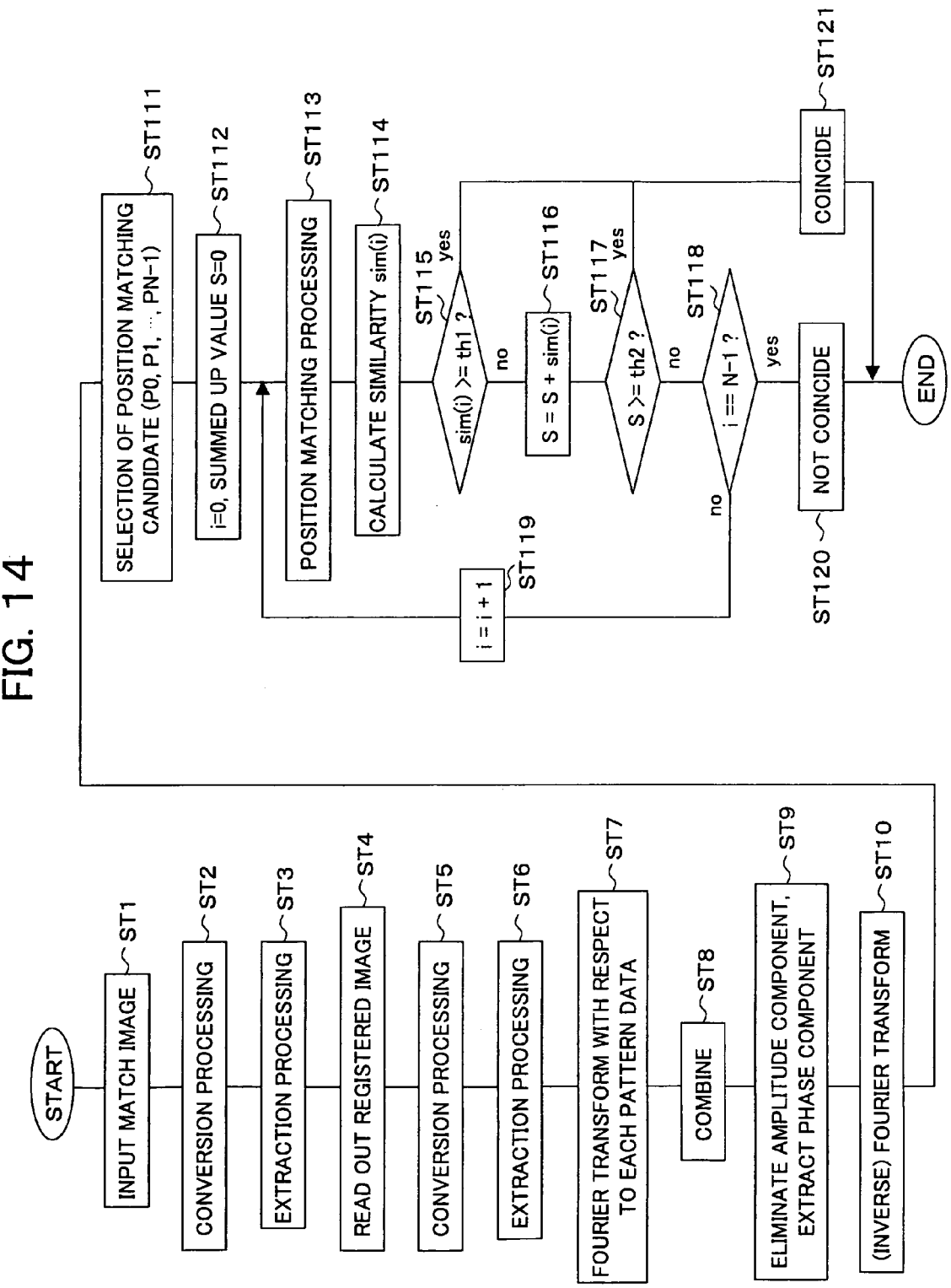
FIG. 14 is a flow chart for explaining the operation of the image matching system according to the second embodiment shown in FIG. 10.

FIG. 14 is a flow chart for explaining the operation of the image matching system according to the second embodiment shown in FIG. 10. An explanation will be given of the operation of the image matching system focusing on the operation of the CPU by referring to FIG. 14. The same notations are assigned to the same operations as those in the first embodiment and the explanation is omitted. Only the differences will be explained. The processings of steps ST1 to ST10 are the same as those of the first embodiment, so the explanations will be omitted. Step ST2 and step ST6 correspond to the fourth step and fourth routine according to the present invention. At step ST111, the position correction unit 170 performs the position correction processing based on the correlation strength image G(p,q) output as the signal S1631 from the correlation value generation unit 163a and the signals S1621 and S1622 output from the extraction unit 162, that is, the patterns in the first converted image and the second converted image, and outputs the results of the position correction processing as the signal S1701 and the signal S1702 to the matching unit 164a. Step ST111 corresponds to the third step and third routine according to the present invention.

For example, in more detail, the position correction unit 170, based on the signal S1631, specifies (selects) for example eight correlation values and correlation peak positions in the present embodiment as shown in FIG. 11A as candidates of the positional relationships in the two-dimensional space between the registered image AIM and the match image RIM, for example, the higher N candidates Pi (P0, P1, . . . , PN−1).

At step ST112, the summation unit 1643 initializes the variables for the summation. For example, it initializes the variables i to 0 and initializes the summed up value S to 0. At step ST113, the position correction unit 170 performs the position correction processing of the registered image AIM and the match image RIM based on for example each candidate (coordinate) Pi and the amount of offset from the center of the correlated image data corresponding to that.

At step ST114, the similarity Sim(i) is calculated by the similarity generation unit 1641 and output to the summation unit 1643 and the decision unit 1642.

The decision unit 1642 compares the similarity Sim(i) and the first threshold value th1 set in advance. When the similarity Sim(i) is smaller than the first threshold value (ST115), the summation unit 1643 sums up the similarities Sim(i), in more detail, sums up the same by the equation S=S+Sim(i), and outputs the same to the decision unit 1642 (ST116). At step ST117, the matching unit 1642 compares the summed up value S and the second threshold value th2 set in advance. When the summed up value S is smaller than the second threshold value th2, it compares the variable i and the value N−1 (ST118). When the variable i does not coincide with N−1, it adds 1 to the variable i (ST119) and returns to the processing of step ST113. At step ST118, when the variable i coincides with N−1, it is decided that the images do not coincide (ST120).

On the other hand, in the comparison processing of step ST115, when the similarity Sim(i) is more than the first threshold value, the matching unit 1642 decides that the images coincide. In the comparison processing of step ST117, when the summed up value S is more than the second threshold value th2, the matching unit 1642 decides that the images coincide (ST121). When the image matching system according to the present embodiment is applied to the vein pattern matching system in for example the security field, the operation processing unit 17 performs processing such as unlocking of the electronic lock.

As explained above, in the present embodiment, the position correction unit 170 generates a plurality of correlation values indicating the correction positions and performs a plurality of position correction processings of the registered image AIM and the match image RIM based on generated plurality of correlation values, and the decision unit 1642 performs the matching processing based on the summed up value of the similarities as the correlation value in accordance with the patterns in the converted images. Therefore, for example, even in a case where the correlation between two 7 image data to be compared is small, by summing up the similarity calculated for each of the positional relationships of a plurality of candidates, the matching can be carried out with a high precision in comparison with the case where the matching is carried out solely by the similarity.

Further, it is decided that the converted images coincide when the similarity Sim is larger than the first threshold value th1, so the matching processing can be carried out at a high speed.

Note that the present invention is not limited to the present embodiment. Various preferred modifications are possible. For example, in the present embodiment, the similarity generation unit calculated the similarity by equation (8), but the invention is not limited to this format. For example, the similarity generation unit may perform the processing for calculating similarity suitable for correlation of the linear components (linear patterns).

Further, the first threshold value th1 and the second threshold value th2 were fixed values, but the present invention is not limited to this format. For example, matching of a higher precision can be carried out by making each of the threshold values variable according to the image pattern.

It is possible even if the image matching system 1b according to the third embodiment of the present invention stores a plurality of images as the registered images or the matching images, performs the correlation processing between converted images having a low resolution (that is, having a small image size) at first when performing the matching processing of the images, and performs the matching processing according to the first embodiment or the second embodiment between images having normal resolutions (that is, normal image size) based on the correlation processing results.

In more detail, the image matching system 1b according to the present embodiment performs for example Image conversion processing based on the distance from the reference position in each of the first image and the second image and the angle formed by the straight line passing through the reference position and the reference axis including the reference position, generates a third converted image and a fourth converted image having a lower resolution than that of the first converted image and the second converted image in the two-dimensional space defined by the distance and angle, decides whether or not the high resolution (normal resolution) correlation processing and the matching processing are to be performed based on the results of the correlation processing at a plurality of different relative locations in the first direction and the second direction orthogonal to the first direction in the generated third converted image and fourth converted image, suspends the matching processing and performs the matching processing for the other image when the correlation value is lower than the predetermined threshold value, and continuously performs the high resolution matching processing for only an image having a resolution higher than the threshold value. The functional block diagram of the image matching system 1b according to the present embodiment has the same components as those of the image matching system according to the first embodiment, so the explanation will be omitted.

Figure 15C:
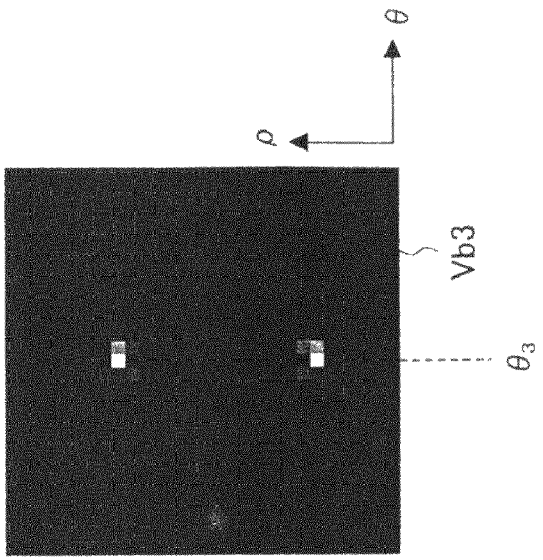
FIGS. 15A to 15C are views for explaining the operation of the image matching system according to a third embodiment of the present invention.
Figure 15B:
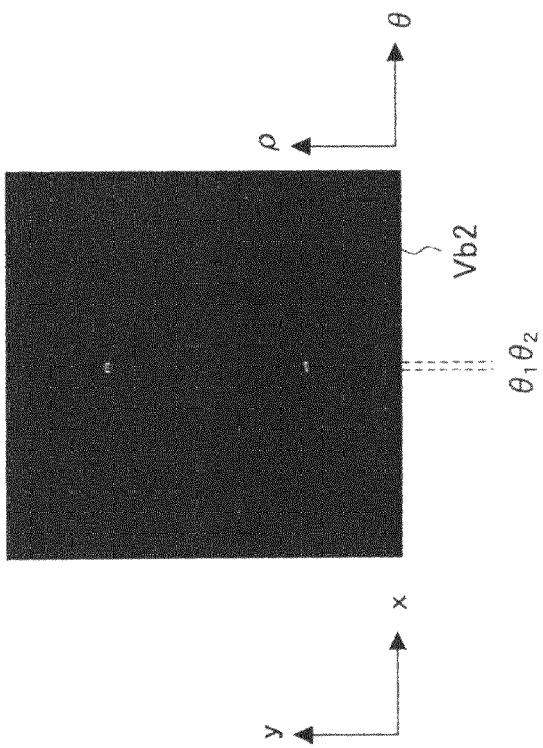
Figure 15A:
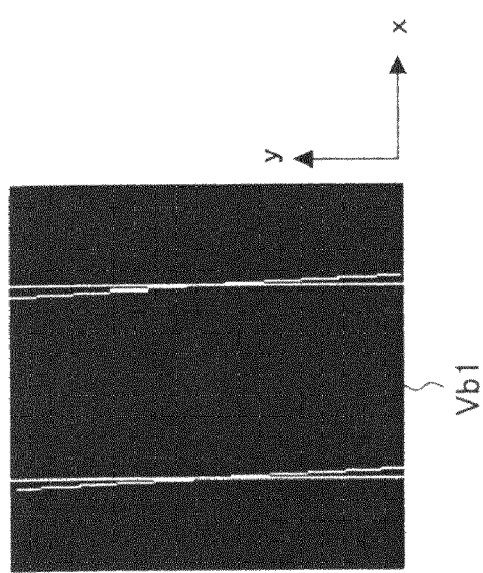

FIG. 15 is a diagram for explaining the operation of an image matching system according to a third embodiment of the present invention. It is determined according to the size of the ρ-θ plane (also referred to as a parameter space) generated by the image conversion processing according to the present embodiment to which extent the straight line on the x-y plane of the image is finely sectioned as a parameter. The larger the size of the parameter space, the finer the straight line can be sectioned, so the higher the resolution by that amount. For example, the conversion unit 161 performs the image conversion processing with a parameter space size of a high resolution (for example, 180×180 pixels) based on an image vb1 including the straight line having a rotation angle offset shown in FIG. 15A and consequently generates an image vb2 shown in FIG. 15B. Further, the conversion unit 161 generates an image vb3 indicating the result of the image conversion processing with a parameter space size of a low resolution (for example 30×30 pixels) based on the image vb1 including the straight lines having the rotation angle offset shown in FIG. 15A.

When comparing the image vb2 and the image vb3, in the image vb2 of high resolution shown in for example FIG. 15B, each of the straight lines having an angle offset before the image conversion are classified to other θ parameters (θ1, θ2), but in contrast, in the image vb3 of low resolution shown in FIG. 15C, they are classified as the same θ parameter (θ3). The processing speed of the matching processing between images after the image conversion processing according to the present invention depends upon the processing speed of the parameter space. In more detail, for example, the larger the size of the parameter space, that is, the higher the resolution, the longer the processing time and the larger the processing load. The smaller the size of the parameter space, that is, the lower the resolution, the shorter the processing time and the smaller the processing load. In the image matching system according to the present embodiment, when the matching is carried out between the input match image RIM and a plurality of registered images AIM stored in the memory 12, first, based on the result of calculation of the correlation value in the parameter space having a low resolution, by excluding an image having a low correlation value as the result of this from the coincidence candidates, the time taken for the entire matching processing is shortened.

Figure 16:
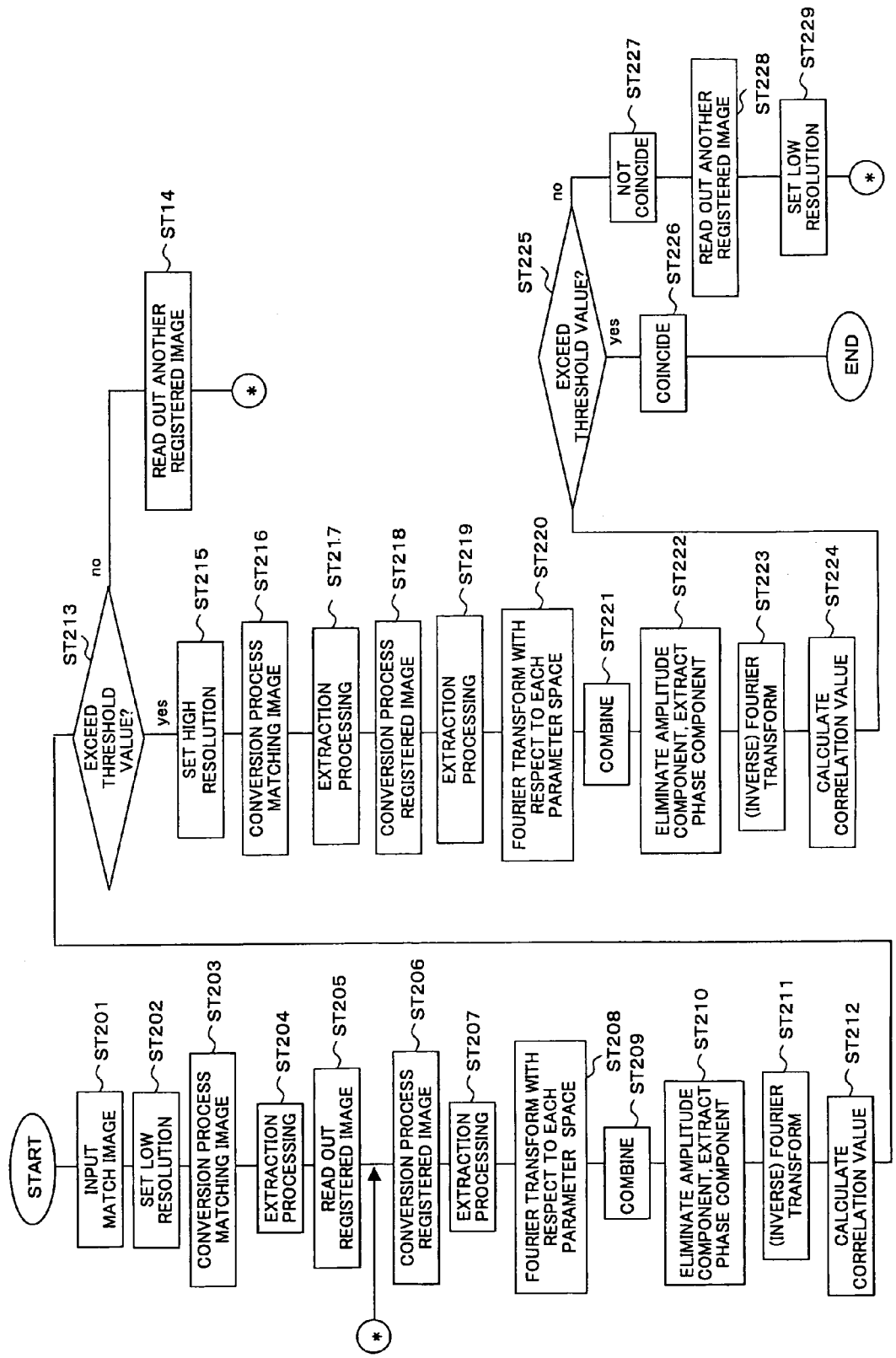
FIG. 16 is a flow chart for explaining the operation of the image matching system according to the third embodiment of the present invention.

FIG. 16 is a flow chart for explaining the operation of the image matching system according to the third embodiment of the present invention. Only the differences from the first embodiment and the second embodiment will be explained focusing on the operation of the CPU of the image matching system by referring to FIG. 16.

For example, a plurality of registered images AIM are input from the image input portion 11 in advance and stored in the memory 12. At step ST201, a match image RIM is input from the image input portion 11 and stored in the memory 12.

Before the high resolution (normal resolution) matching processing, based on a first image and a second image, image conversion processing is performed based on the distance from a reference position in each of the first image and the second image and the angle formed by the straight line passing through the reference position and the reference axis including the reference position, a third converted image and a fourth converted image having a lower resolution than that of the first converted image and the second converted image in a two-dimensional space defined by the distance and angle are generated, and it is decided whether or not high resolution conversion processing and matching processing are to be performed based on the results of the correlation processing at a plurality of different relative locations in the first direction and the second direction orthogonal to the first direction in the generated third converted image and fourth converted image.

Concretely, at step 202, a parameter space of a low resolution is set. At step ST203, the conversion unit 161 performs image processing of converting points in the image to pattern of curves PL based on the distance ρ0 from the reference position O to the closest point P0 on the straight line L0 passing through the points in the image and the angle θ formed by the straight line n0 passing through the reference position O and the closest point P0 and the x-axis as the reference axis including the reference position O as shown in FIG. 3A based on for example the match image RIM and converting the linear components L in the image to patterns of a plurality of overlapped curves PL and generates the signal S1612 as the converted image in the ρ-θ space.

At step ST204, the extraction unit 162 performs the extraction processing (masking processing) for a region having a degree of overlapping of patterns of curves in one converted image more than the threshold value set in advance based on the converted image S1612. In more detail, as explained above, in each pixel in the image S1612, a value in accordance with the degree of overlapping of patterns of curves is set. Among the images indicated by the predetermined halftone, the higher the degree of overlapping of patterns of curves, the whiter the display. For example, the extraction unit 162 extracts a region having a degree of overlapping of patterns of curves in the converted image S1612 more than a threshold value set in advance, generates the image S1622, and outputs the same to the correlation value generation unit 163.

At step ST205, the CPU 16 reads out a registered image AIM stored in the memory 12. At step ST206, the conversion unit 161 performs image processing for converting points in the image to patterns of the curves PL based on the distance ρ0 from the reference position O to the closest point P0 on the straight line L0 passing through the points in the image and the angle θ formed by the straight line n0 passing through the reference position O and the closest point P0 and the x-axis as the reference axis including the reference position O as shown in FIG. 3A based on for example the registered image AIM and converting the linear components L in the image to patterns of a plurality of overlapped curves PL and generates the signal S1611 as the converted image in the ρ-θ space.

At step ST207, the extraction unit 162 performs the extraction processing (masking processing) for a region having a degree of overlapping of patterns of curves in one converted image more than a threshold value set in advance based on the converted image S1611. For example, the extraction unit 162 extracts a region having a degree of overlapping of patterns of curves in the converted image S1611 more than the threshold value set in advance, generates the image S1621, and outputs the same to the correlation value generation unit 163.

The correlation value generation unit 163 generates correlation values between the registered image AIM and the match image RIM based on the degree of overlapping of patterns in the converted image S1621 and the converted image S1622 and coincidence/incoincidence of patterns in the converted image S1621 and the converted image S1622. In more detail, at step ST208, the Fourier transform units 16311 and 16312 of the correlation unit 1631 perform Fourier transform processings for the converted images S1621 and 1622 as shown in for example equations (2) and (3) and outputs the processing results as signals S16311 and S16312 to the combining unit 16313.

The processings of steps ST201 to ST208 need not be in the above sequence. For example, it is also possible to perform the conversion processing of the registered image AIM and the match image RIM by for example the conversion unit 161, then perform the extraction processing (masking processing) of the converted image by the extraction unit 162.

At step ST209, the combining unit 16313 performs the combining processing as mentioned above based on the signals S16311 and S16312 and outputs the processing result as the signal S16313 to the phase extraction unit 16314. At step ST210, the phase extraction unit 16314 extracts only the phase component based on the signal S16313 and outputs the same as the signal S16314 to the inverse Fourier transform unit 16315.

At step ST211, the inverse Fourier transform unit 16315 performs the inverse Fourier transform processing based on the signal S16314 and outputs the same as the signal S1631 to the correlation value detection unit 1632 as shown in for example FIG. 7C. The magnitude of the correlation strength peak of this correlation strength image S1631 indicates the degree of the correlation between the converted images after the image conversion. For example, when there is parallel movement offset between the converted images, the position of the correlation strength peak of the correlation strength image S1631 is offset from the center position O by exactly the amount corresponding to the amount of parallel movement offset between converted images, but does not exert an influence upon the correlation strength.

At step ST212, the correlation value detection unit 1632 defines the strength of the correlation strength peak PP as the correlation value and outputs the signal S163 to the matching unit 164.

At step ST213, the matching unit 164 performs the matching based on the signal S163 indicating the correlation value from the correlation value detection unit 1632. In more detail, the matching unit 164 decides whether or not the correlation value is larger than a threshold value determined in advance and, when deciding that the correlation value is smaller, suspends the matching of the registered image AIM, reads out another registered image AIM in the memory 12, and returns to the processing of step 206.

On the other hand, when deciding that the correlation value is larger than the threshold value determined in advance at step ST213, the matching unit 164 decides that the registered image AIM is a coincidence candidate of the match image RIM and sets a parameter space of a high resolution.

Below, in the same way as above, the same processings as those of step ST203 to step ST212 are carried out for the image of the high resolution parameter space (ST216 to ST224).

At step ST225, the matching unit 164 performs the matching based on the signal S163 indicating the correlation value from the correlation value detection unit 1632. In more detail, the matching unit 164 decides whether or not the correlation value is larger than the threshold value determined in advance. When deciding that the correlation value is larger, it outputs the matching result signal 5164 indicating that the registered image AIM and the match image RIM coincide (ST226). On the other hand, when deciding that the correlation value is smaller than the threshold value determined in advance at step ST225, the matching unit 164 outputs the matching result signal S164 indicating that the registered image AIM and the match image RIM do not coincide (ST227), reads out another registered image AIM in the memory 12 (ST228), sets the low resolution (ST229), and returns to the processing of step 206.

As explained above, in the present embodiment, before the high resolution (normal resolution) matching processing, based on the first image and the second image, the image conversion processing is performed based on the distance from the reference position in each of the first image and the second image and the angle formed by the straight line passing through the reference position and the reference axis including the reference position, the third converted image and the fourth converted image having a lower resolution than that of the first converted image and the second converted image in the two-dimensional space defined by the distance and angle are generated, and it is decided whether or not the high resolution conversion processing and matching processing are to be performed based on the results of the correlation processing at a plurality of different relative locations in the first direction and the second direction orthogonal to the first direction in the generated third converted image and fourth converted image. When the correlation value is lower, the matching of the images is suspended and the matching processing of another image is carried out, so the processing time of the overall matching processing can be shortened. Further, the low resolution image matching processing is first carried out, so the processing load is reduced.

Note that the present invention is not limited to the present embodiment. Any suitable modification is possible. For example, by performing the low resolution image conversion processing for the registered image AIM in advance and performing the matching processing between these images, the matching time can be shortened more.

For example, the present invention can also be applied to security related applications for matching two images of blood vessel images, fingerprint images, still images, and moving images based on the linear components in the images.

Summarizing the effects of the invention, according to the present invention, an image matching method capable of matching images with a high precision and a program and an image matching system for the same can be provided.

While the invention has been described with reference to specific embodiments chosen for purpose of illustration, it should be apparent that numerous modifications could be made thereto by those skilled in the art without departing from the basic concept and scope of the invention.

The invention claimed is:

1. A blood vessel authentication apparatus comprising:
    an inputted image acquiring section configured to acquire an inputted image;
    a transforming section configured to transform the inputted image to transformed information indicating image points in the inputted image based on a distance from a reference position to a closest point on a straight line passing through each image point;
    a proper information acquiring section configured to acquire proper information indicating image points in the proper image based on a distance from a reference position to a closest point on a straight line passing through each image point;
    a matching section configured to match the transformed information and the proper information; and
    an authentication section configured to authenticate the inputted image according to the result of matching by the matching section, wherein
    the matching section performs a Fourier transformation for the inputted and proper images and performs the matching of the inputted and proper image on the basis of correlated values responsive to phase components of the resultant Fourier transformation processed values.

2. The blood vessel authentication apparatus according to claim 1, further comprising:
    a converting section configured to perform image conversion processing of converting points in each image to patterns of curves based on the distance from the reference position to the closest point on a straight line passing through the points in the image and an angle formed by the straight line passing through the reference position and the closest point and the reference axis including the reference position and converting the linear components in each image to patterns of a plurality of overlapped curves to generate the inputted image and the proper image.

3. The blood vessel authentication apparatus according to claim 2, further comprising:
    a position correcting section configured to correct position on the basis of patterns in the inputted and proper transformed images, wherein,
    the matching section performs the image matching of the inputted and the proper image on a degree of the overlapping of patterns in the inputted and proper transformed images processed the position correction and a coincidence or non-coincidence of patterns in the inputted and proper transformed images.

4. The blood vessel authentication apparatus according to claim 3, further comprising:
    an extracting section configured to extract a region of the respective inputted and proper transformed images, the region having a degree of the overlapping of the pattern of the curves in one transformed image higher than a predetermined threshold value,
    wherein the position correcting section performs the position correction on the basis of the pattern in the extracted region of the inputted and proper transformed images, and
    wherein the matching section performs the image matching on the basis of a coincidence or non-coincidence of the pattern in the extracted region of the inputted and proper transformed images, correction position.

5. The blood vessel authentication apparatus according to claim 3, wherein the matching section:
    compares a different plurality of positional relationships in the inputted and proper transformed images, generated in the conversion section;
    generates a degree of similarity as the correlation value from the comparison result; and
    carries out the image matching on the basis of the generated degree of similarity.

* * * * *